(12) United States Patent
McPherson et al.

(10) Patent No.: US 10,309,153 B2
(45) Date of Patent: Jun. 4, 2019

(54) SUPPORT SYSTEM FOR ROLLED MATERIAL

(71) Applicant: Draper, Inc., Spiceland, IN (US)

(72) Inventors: Jerry L. McPherson, Charlottesville, IN (US); Christopher Todd Field, Rushville, IN (US)

(73) Assignee: Draper, Inc., Spiceland, IN (US)

( * ) Notice: Subject to any disclaimer, the term of this patent is extended or adjusted under 35 U.S.C. 154(b) by 125 days.

(21) Appl. No.: 15/275,989

(22) Filed: Sep. 26, 2016

(65) Prior Publication Data

US 2018/0087319 A1    Mar. 29, 2018

(51) Int. Cl.
| | |
|---|---|
| *E06B 9/17* | (2006.01) |
| *E06B 9/42* | (2006.01) |
| *B65H 16/02* | (2006.01) |
| *B65H 16/06* | (2006.01) |
| *B65H 75/44* | (2006.01) |
| *G03B 21/58* | (2014.01) |
| *E06B 9/70* | (2006.01) |
| *E06B 9/58* | (2006.01) |

(52) U.S. Cl.
CPC ............ *E06B 9/42* (2013.01); *B65H 16/028* (2013.01); *B65H 16/06* (2013.01); *B65H 75/4471* (2013.01); *B65H 75/4481* (2013.01); *E06B 9/581* (2013.01); *E06B 9/70* (2013.01); *G03B 21/58* (2013.01)

(58) Field of Classification Search
CPC ..... E06B 9/42; E06B 9/50; E06B 9/40; E06B 9/581; E06B 9/72; E06B 9/17; E06B 9/17007; E06B 9/17015; E06B 9/174; E06B 2009/1743; B65H 75/4471; G03B 21/56; G03B 21/562; G03B 21/58
USPC .... 160/242, 246, 247, 261, 323.1, 324, 325, 160/326, 23.1, 31, 266, 267.1, 268.1, 270, 160/271, 272
See application file for complete search history.

(56) References Cited

U.S. PATENT DOCUMENTS

| | | | |
|---|---|---|---|
| 808,400 A | 12/1905 | Parsons | |
| 1,025,312 A * | 5/1912 | Rydquist | ................ A47K 10/36 242/564.1 |
| 1,153,015 A * | 9/1915 | Bauer | ....................... E06B 9/78 160/273.1 |

(Continued)

FOREIGN PATENT DOCUMENTS

| | | |
|---|---|---|
| DE | 2631747 A1 | 2/1977 |
| DE | 4105975 A1 | 8/1992 |

(Continued)

OTHER PUBLICATIONS

*MagnaShade. Small Profile. Big Solution.*, MechoShade Systems, Inc., Long Island City, New York, (2013), 2 pages.

(Continued)

*Primary Examiner* — Katherine W Mitchell
*Assistant Examiner* — Johnnie A. Shablack
(74) *Attorney, Agent, or Firm* — Faegre Baker Daniels LLP

(57) ABSTRACT

A support system for moving a rolled material between a rolled configuration and an extended configuration. The support system may include a roller having a longitudinal axis, a housing supporting the roller, and a cradle extending along a first longitudinal length of the roller. The cradle may include a base removably coupled to the housing and a contact member supported by the base.

47 Claims, 23 Drawing Sheets

(56) References Cited

U.S. PATENT DOCUMENTS

| | | | |
|---|---|---|---|
| 1,358,958 A | 11/1920 | Johnson | |
| 1,377,784 A | 5/1921 | Nodland | |
| 1,595,234 A | 8/1926 | Kuyper | |
| 1,612,261 A * | 12/1926 | Burns | E06B 9/54 160/23.1 |
| 1,615,830 A | 2/1927 | Derus | |
| 1,681,016 A * | 8/1928 | Schmidt | E04F 10/0662 242/595.1 |
| 1,742,549 A | 1/1930 | MacArthur et al. | |
| 1,797,321 A | 3/1931 | Cahill | |
| 1,815,551 A * | 7/1931 | Dunn | E06B 9/581 160/273.1 |
| 1,825,198 A | 9/1931 | Negrini | |
| 1,882,623 A * | 10/1932 | Kasper | E06B 9/50 160/299 |
| 2,013,500 A * | 9/1935 | O'Connor | E06B 9/50 248/269 |
| 2,326,642 A | 8/1943 | Heiser | |
| 2,360,329 A | 10/1944 | Cameron | |
| 2,722,387 A * | 11/1955 | Tuttle | A47K 10/40 225/38 |
| 2,894,578 A * | 7/1959 | Caesar | E06B 9/324 160/308 |
| 3,222,689 A * | 12/1965 | Efron | A47K 3/38 4/608 |
| 3,421,568 A | 1/1969 | Youngs | |
| 3,724,525 A | 4/1973 | Boneck | |
| 3,900,063 A | 8/1975 | Roller | |
| 4,223,714 A | 9/1980 | Weinreich et al. | |
| 4,262,729 A | 4/1981 | Von Knorring | |
| 4,323,105 A | 4/1982 | Berman et al. | |
| 4,344,474 A | 8/1982 | Berman | |
| 4,347,886 A | 9/1982 | Von Knorring | |
| 4,359,079 A * | 11/1982 | Bledsoe | E06B 9/40 160/121.1 |
| RE31,793 E | 1/1985 | Berman et al. | |
| 4,497,453 A * | 2/1985 | Butcher | B65H 16/005 242/423.2 |
| 4,649,981 A * | 3/1987 | Bibeau | E06B 9/581 160/120 |
| 4,834,160 A | 5/1989 | Becker | |
| 5,060,943 A | 10/1991 | Stoffo | |
| 5,119,867 A | 6/1992 | Lukos | |
| 5,224,307 A | 7/1993 | Lukos | |
| 5,237,785 A | 8/1993 | Lukos | |
| 5,273,095 A | 12/1993 | Lukos | |
| 5,323,831 A * | 6/1994 | Manthei | E06B 9/581 160/23.1 |
| 5,423,506 A * | 6/1995 | Spoon | B60P 3/343 135/88.1 |
| 5,482,104 A * | 1/1996 | Lichy | E06B 9/13 160/273.1 |
| 5,601,253 A * | 2/1997 | Formon | A47K 10/3827 242/595.1 |
| 5,819,831 A | 10/1998 | Schanz | |
| 5,862,851 A | 1/1999 | Stoebich et al. | |
| 6,059,007 A | 5/2000 | Tomita | |
| 6,111,694 A * | 8/2000 | Shopp | G03B 21/58 160/23.1 |
| 6,164,428 A | 12/2000 | Berman et al. | |
| 6,196,508 B1 * | 3/2001 | Nijs | A47H 1/13 248/267 |
| 6,230,782 B1 * | 5/2001 | Reichert | E06B 9/17023 160/23.1 |
| 6,290,164 B1 * | 9/2001 | O'Connor | B65D 19/44 242/471 |
| 6,357,507 B1 | 3/2002 | Stoebich et al. | |
| 6,394,173 B2 * | 5/2002 | Enssle | E06B 9/581 160/273.1 |
| 6,402,110 B1 | 6/2002 | Berman et al. | |
| 6,592,013 B1 * | 7/2003 | Fujiwara | A47K 10/38 225/39 |
| 6,691,761 B1 * | 2/2004 | Alkhoury | E06B 9/54 160/273.1 |
| 6,817,399 B2 | 11/2004 | Berman et al. | |
| 6,873,461 B1 * | 3/2005 | McPherson, Jr. | E06B 9/50 160/23.1 |
| 7,018,119 B2 * | 3/2006 | Koyabu | B41J 15/042 242/563 |
| 7,040,567 B1 * | 5/2006 | Lewis | B65D 5/4608 206/408 |
| 7,111,662 B2 | 9/2006 | Lukos | |
| 7,134,473 B2 | 11/2006 | Lukos | |
| 7,275,581 B2 | 10/2007 | Coenraets | |
| 7,380,582 B1 * | 6/2008 | Anderson | E06B 9/34 160/323.1 |
| 7,416,014 B2 * | 8/2008 | Coenraets | E06B 9/581 160/194 |
| 7,417,397 B2 | 8/2008 | Berman et al. | |
| 7,441,582 B2 | 10/2008 | Lukos | |
| 7,516,770 B2 * | 4/2009 | Jerry | E06B 9/13 160/267.1 |
| D601,716 S | 10/2009 | Konrad et al. | |
| D602,170 S | 10/2009 | Konrad et al. | |
| 7,617,858 B2 * | 11/2009 | Hoffmann | E06B 9/323 160/11 |
| 7,625,151 B2 | 12/2009 | Li et al. | |
| 7,684,022 B2 | 3/2010 | Berman et al. | |
| D617,006 S | 6/2010 | Konrad | |
| 7,770,625 B2 | 8/2010 | Lukos | |
| 7,841,377 B2 * | 11/2010 | Coenraets | E06B 9/13 160/264 |
| 7,854,419 B2 * | 12/2010 | Ng | E06B 9/50 160/323.1 |
| D631,171 S | 1/2011 | Konrad | |
| 7,977,904 B2 | 7/2011 | Berman et al. | |
| 8,016,016 B2 | 9/2011 | Berman et al. | |
| D649,661 S | 11/2011 | Konrad | |
| 8,113,265 B2 * | 2/2012 | Hardison, III | E06B 9/13 160/179 |
| 8,125,172 B2 | 2/2012 | Berman et al. | |
| 8,220,520 B2 | 7/2012 | Lukos | |
| 8,272,425 B2 | 9/2012 | Coenraets | |
| 8,276,642 B2 | 10/2012 | Berman et al. | |
| 8,482,724 B2 | 7/2013 | Berman et al. | |
| 8,505,609 B2 * | 8/2013 | Huang | E06B 9/42 160/293.1 |
| 8,525,462 B2 | 9/2013 | Berman et al. | |
| 8,528,623 B2 | 9/2013 | Roberts | |
| 8,584,731 B1 | 11/2013 | Konrad et al. | |
| 8,587,242 B2 | 11/2013 | Berman et al. | |
| 8,672,115 B1 * | 3/2014 | Jennings | E06B 9/56 160/298 |
| D705,040 S | 5/2014 | Konrad et al. | |
| 8,723,467 B2 | 5/2014 | Berman et al. | |
| 8,789,576 B2 | 7/2014 | Krueger et al. | |
| 8,804,239 B2 | 8/2014 | Qingjun et al. | |
| 8,851,147 B2 * | 10/2014 | Drifka | E06B 9/13 160/268.1 |
| 8,857,497 B1 | 10/2014 | Konrad et al. | |
| 8,967,568 B2 * | 3/2015 | Wills | E06B 9/50 160/323.1 |
| 9,206,640 B1 * | 12/2015 | Jennings | E06B 9/56 |
| 9,206,641 B2 * | 12/2015 | Feldstein | E06B 9/50 |
| 9,243,446 B2 * | 1/2016 | Weiss | E06B 9/24 |
| 9,303,707 B2 * | 4/2016 | Fraczek | F16D 67/02 |
| 9,347,261 B2 * | 5/2016 | Blair | E06B 9/42 |
| 9,371,689 B2 * | 6/2016 | Licciardi Di Stefano | E06B 9/581 |
| 9,476,255 B2 | 10/2016 | Nurre et al. | |
| 9,956,442 B2 * | 5/2018 | Cooper | A62C 2/10 |
| 2001/0005002 A1 | 6/2001 | Berman et al. | |
| 2005/0183835 A1 * | 8/2005 | Nien | E06B 9/50 160/321 |
| 2006/0042766 A1 * | 3/2006 | Jorgensen | E06B 9/40 160/310 |
| 2006/0049325 A1 * | 3/2006 | Jung | E06B 9/50 248/266 |

(56) References Cited

U.S. PATENT DOCUMENTS

| | | | |
|---|---|---|---|
| 2006/0060313 A1* | 3/2006 | Lukos | E04F 10/0662 160/242 |
| 2006/0289120 A1 | 12/2006 | Pielmeier | |
| 2009/0152422 A1* | 6/2009 | Ng | E06B 9/50 248/265 |
| 2009/0229767 A1* | 9/2009 | Mullet | E06B 9/581 160/26 |
| 2009/0250177 A1* | 10/2009 | Byeon | E06B 9/40 160/323.1 |
| 2010/0116448 A1 | 5/2010 | Healam et al. | |
| 2010/0219306 A1* | 9/2010 | Detmer | E06B 9/72 248/201 |
| 2010/0294440 A1 | 11/2010 | Li et al. | |
| 2011/0031343 A1* | 2/2011 | Anderson | E06B 9/34 242/396.4 |
| 2011/0139382 A1* | 6/2011 | Daniels | E06B 9/50 160/309 |
| 2011/0203748 A1* | 8/2011 | Mullet | E06B 9/42 160/310 |
| 2012/0012262 A1* | 1/2012 | Santoro | E06B 9/42 160/272 |
| 2013/0068904 A1* | 3/2013 | Wills | E06B 9/50 248/207 |
| 2013/0098561 A1* | 4/2013 | Mullet | E06B 9/42 160/29 |
| 2014/0262076 A1* | 9/2014 | Mullet | E06B 9/58 160/295 |
| 2014/0355098 A1 | 12/2014 | Berman et al. | |
| 2015/0007949 A1* | 1/2015 | Daniels | E06B 9/50 160/323.1 |
| 2015/0225999 A1 | 8/2015 | Berman et al. | |
| 2015/0300079 A1* | 10/2015 | Dallan | E06B 9/17015 248/266 |
| 2015/0345215 A1 | 12/2015 | Roberts | |
| 2015/0345216 A1* | 12/2015 | Feldstein | E06B 9/50 160/310 |
| 2015/0368970 A1* | 12/2015 | Chambers | E06B 9/80 160/323.1 |
| 2017/0022758 A1 | 1/2017 | Nurre et al. | |
| 2017/0130526 A1* | 5/2017 | Gasparrini | E06B 9/44 |
| 2018/0023340 A1* | 1/2018 | Goldberg | E06B 9/56 |

FOREIGN PATENT DOCUMENTS

| | | |
|---|---|---|
| DE | 29901034 | 8/1999 |
| DE | 10252669 A1 | 6/2004 |
| EP | 0337033 A1 | 10/1989 |
| EP | 0745742 A2 | 12/1996 |
| EP | 0792978 A1 | 9/1997 |
| EP | 2360329 A2 | 8/2011 |
| EP | 2366864 A2 | 9/2011 |
| EP | 2388430 A2 | 11/2011 |
| EP | 2476812 A2 | 7/2012 |
| EP | 2770153 A1 | 8/2014 |
| EP | 2333194 B1 | 11/2014 |
| EP | 2489811 B1 | 9/2015 |
| WO | WO 81/02911 | 10/1981 |
| WO | WO 97/10398 | 3/1997 |
| WO | WO 2013/112255 A1 | 8/2013 |
| WO | WO 2014/074308 A4 | 5/2014 |
| WO | WO 2014/136095 A1 | 9/2014 |
| WO | WO 2015/055993 A1 | 4/2015 |
| WO | WO 2015/063699 A1 | 5/2015 |
| WO | WO 2015/075609 A1 | 5/2015 |
| WO | WO 2015/104675 A1 | 7/2015 |
| WO | WO 2015/170275 A1 | 11/2015 |

OTHER PUBLICATIONS

*MagnaShade. Small Profile. Big Solution.*, MechoShade Systems, Inc., Long Island City, New York, (2014), 4 pages.

\* cited by examiner

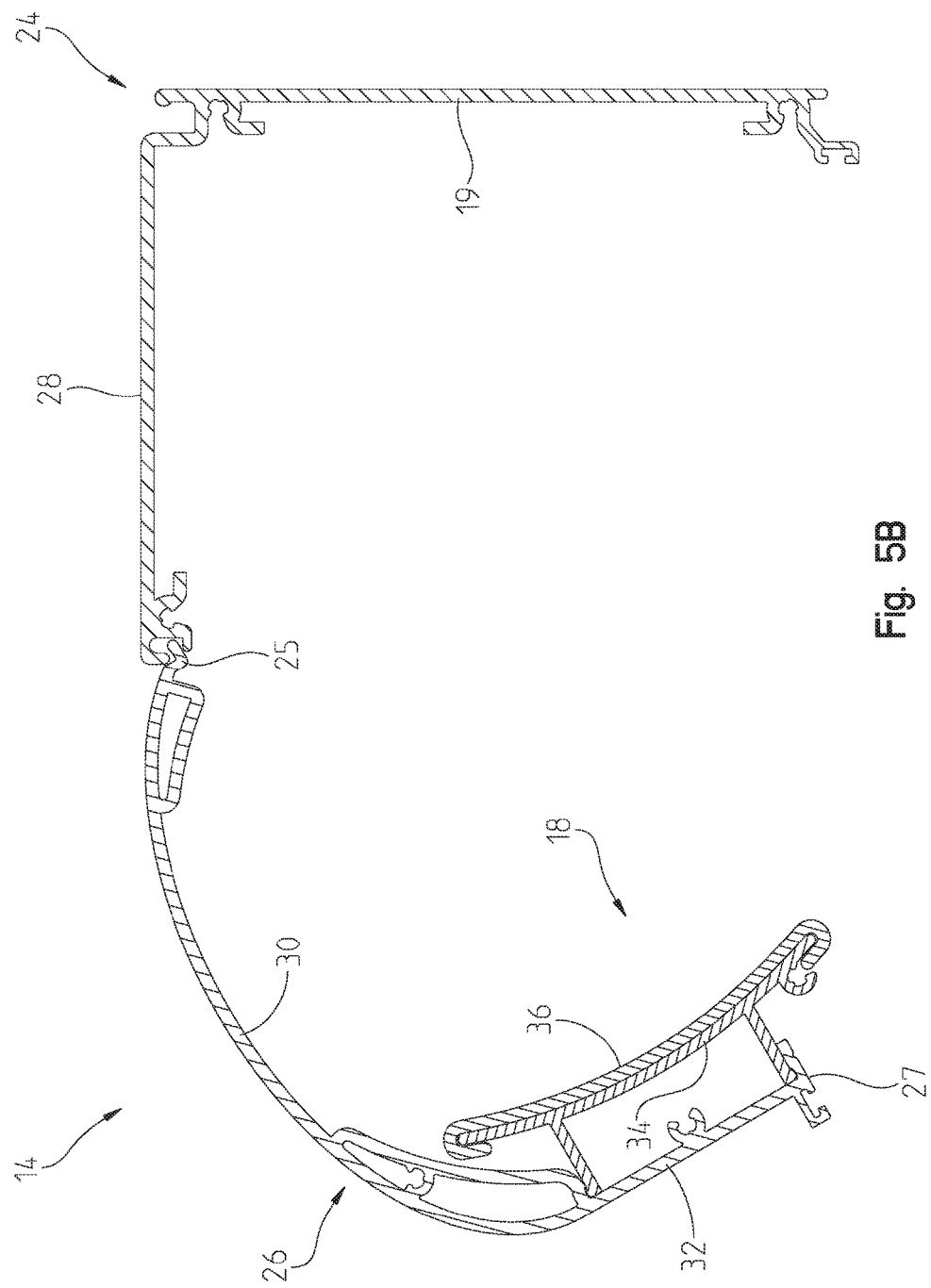

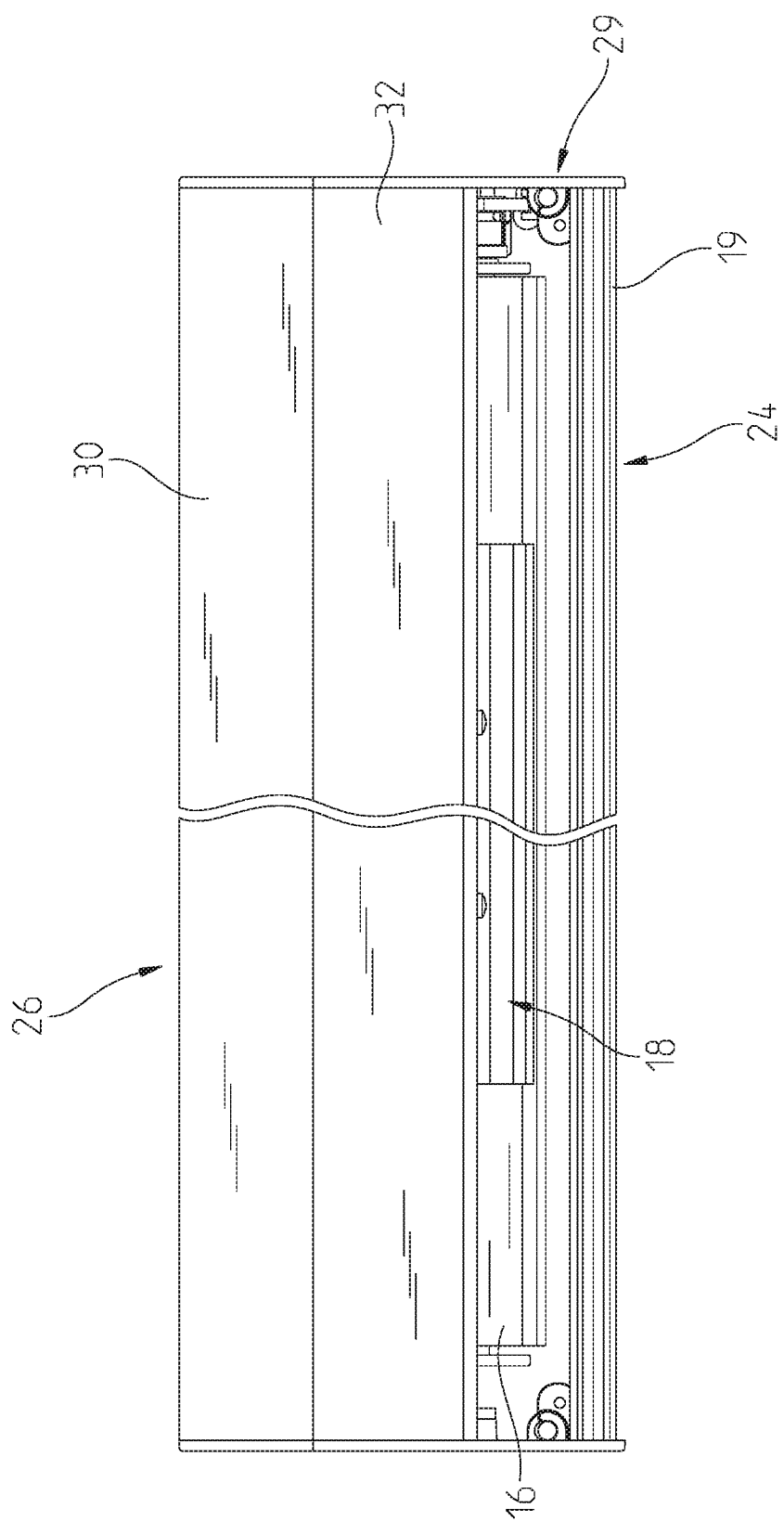

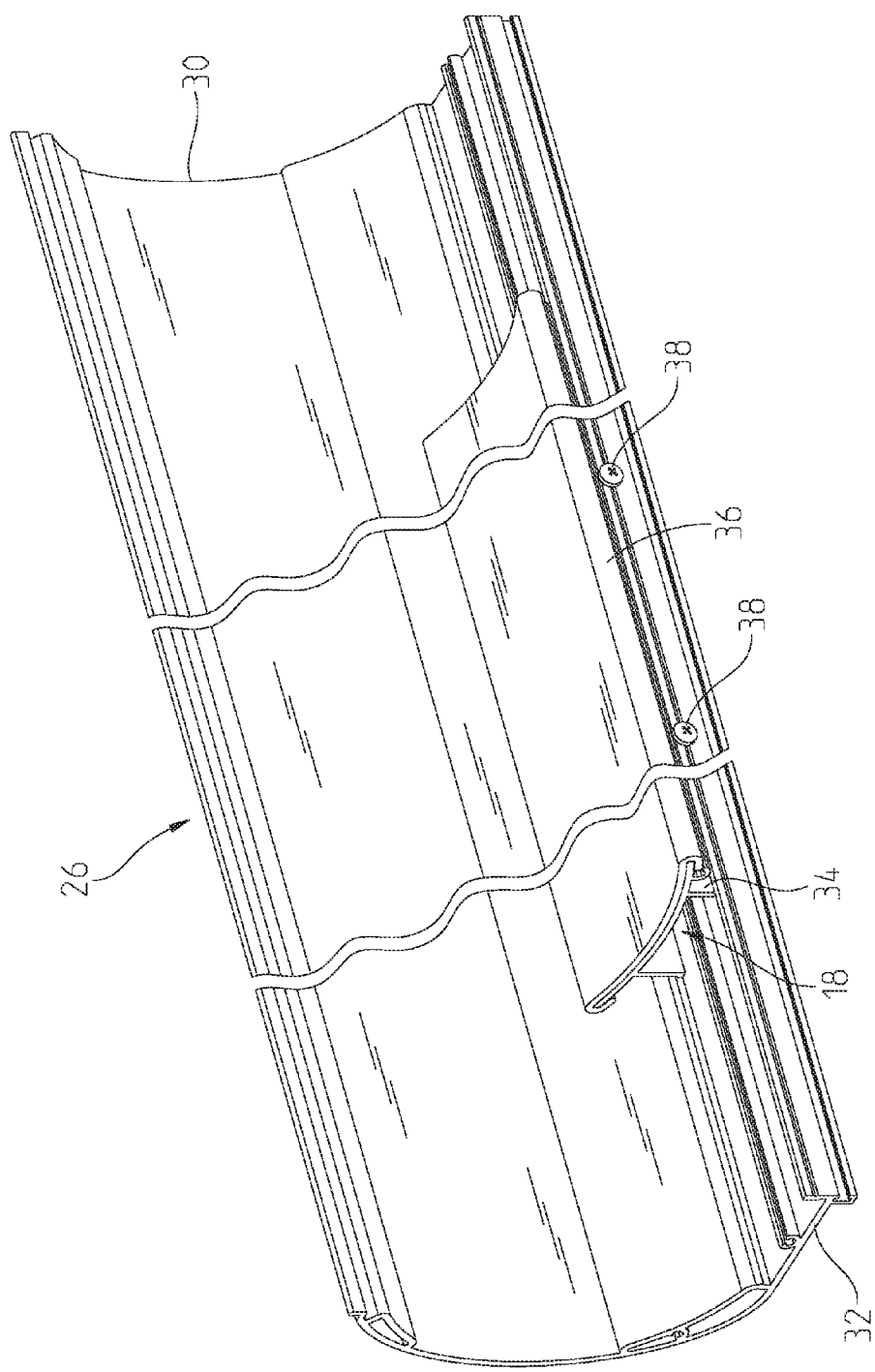

SUPPORT SYSTEM FOR ROLLED MATERIAL

TECHNICAL FIELD OF THE DISCLOSURE

The present disclosure relates to a support system for rolled material and, more particularly, to a support system for rolled material having a cradle positioned beneath a roller and supporting at least a portion of the longitudinal length of the roller.

BACKGROUND OF THE DISCLOSURE

Rolled material, such as a window shade or a projection screen, is often rolled onto a roller. As a longitudinal length of the roller is increased to accommodate wider rolled materials, there is a tendency for a center portion of the roller to sag and disrupt uniform rolling of the rolled material onto the roller. Various attempts have been made to reduce the sagging of the roller by supporting the roller.

SUMMARY OF THE DISCLOSURE

In an exemplary embodiment of the present disclosure, a support system for a rolled material moveable between a rolled configuration and an extended configuration is provided. The support system comprising a roller having a longitudinal axis, the roller adapted to be coupled to the rolled material; a housing supporting the roller and having a dispensing passage through which the rolled material extends; and a cradle extending along a first longitudinal length of the roller. The cradle including a base coupled to the housing and a contact member supported by the base. The contact member and the base are positioned directly below the longitudinal axis of the roller in a vertical direction. The contact member is positionable to contact the rolled material. The contact member remains stationary as the rolled material moves between the rolled configuration and the extended configuration.

In another exemplary embodiment of the present disclosure, a support system for a rolled material moveable between a rolled configuration and an extended configuration is provided. The support system comprising a roller having a longitudinal axis, the roller adapted to be coupled to rolled material; a housing supporting the roller and having a dispensing passage through which the rolled material extends, the dispensing passage being located on a bottom side of the housing; and a cradle removeably coupled to the housing below the roller in a vertical direction. The cradle extending along a first longitudinal length of the roller. The cradle being positioned directly below the longitudinal axis of the roller to support the roller in the vertical direction, wherein the cradle remains stationary as the rolled material moves between the rolled configuration and the extended configuration. An overall longitudinal length of the cradle is less than an overall longitudinal length of the housing.

In a further exemplary embodiment of the present disclosure, a support system for a rolled material moveable between a rolled configuration and an extended configuration is provided. The support system comprising a roller having a longitudinal axis, the roller adapted to be coupled to the rolled material; a housing supporting the roller and having a dispensing passage through which the rolled material extends, the roller being restricted to translational movement in a vertical direction while the rolled material moves between the rolled configuration and the extended configuration; a first stop member supported by the housing and positioned adjacent a first end of the roller; a second stop member supported by the housing and positioned adjacent a second end of the roller; and a cradle extending along a first longitudinal length of the roller. The cradle is positioned directly below the longitudinal axis of the roller to support the roller in thea vertical direction. The first and second stop members are configured to support the roller when the roller is unsupported by the cradle.

BRIEF DESCRIPTION OF THE DRAWINGS

Advantages and features of the embodiments of this disclosure will become more apparent from the following detailed description of exemplary embodiments when viewed in conjunction with the accompanying drawings, wherein:

FIG. 5B illustrates a cross-sectional view of the housing and the cradle of FIG. 5A during assembly;

FIG. 6 illustrates a partial, bottom view of the support system of FIG. 1;

FIG. 7 illustrates a perspective view of a cover member of the housing and a cradle of the support system of FIG. 1;

Figure 1:
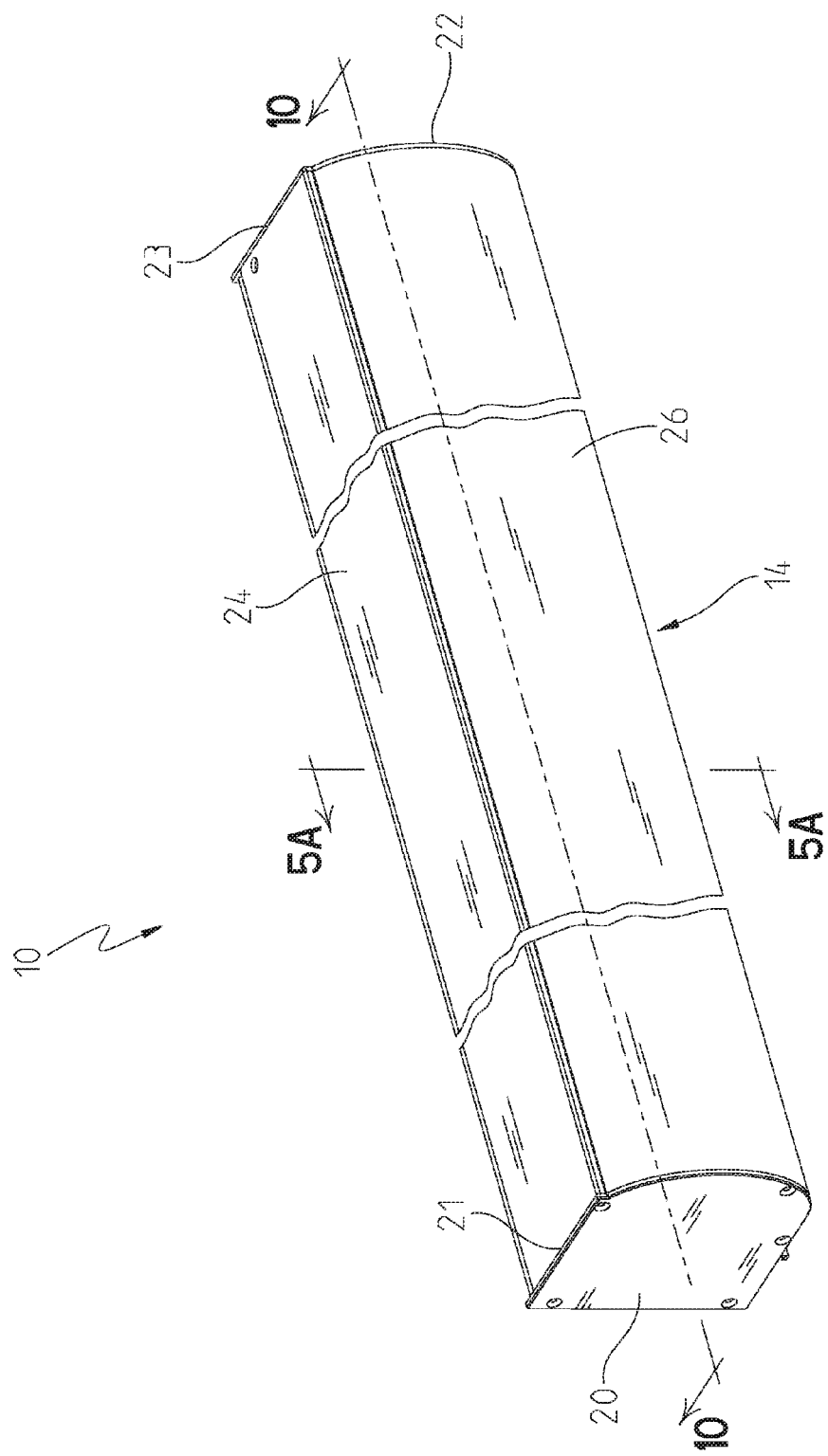
FIG. 1 illustrates a partial, perspective view of an exemplary support system of the present disclosure including a rolled material wound onto a roller in a rolled configuration and positioned within a housing.

Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplifications set out herein illustrate embodiments of the disclosure, in one form, and such exemplifications are not to be construed as limiting the scope of the disclosure in any manner.

DETAILED DESCRIPTION OF THE DRAWINGS

Figure 2:
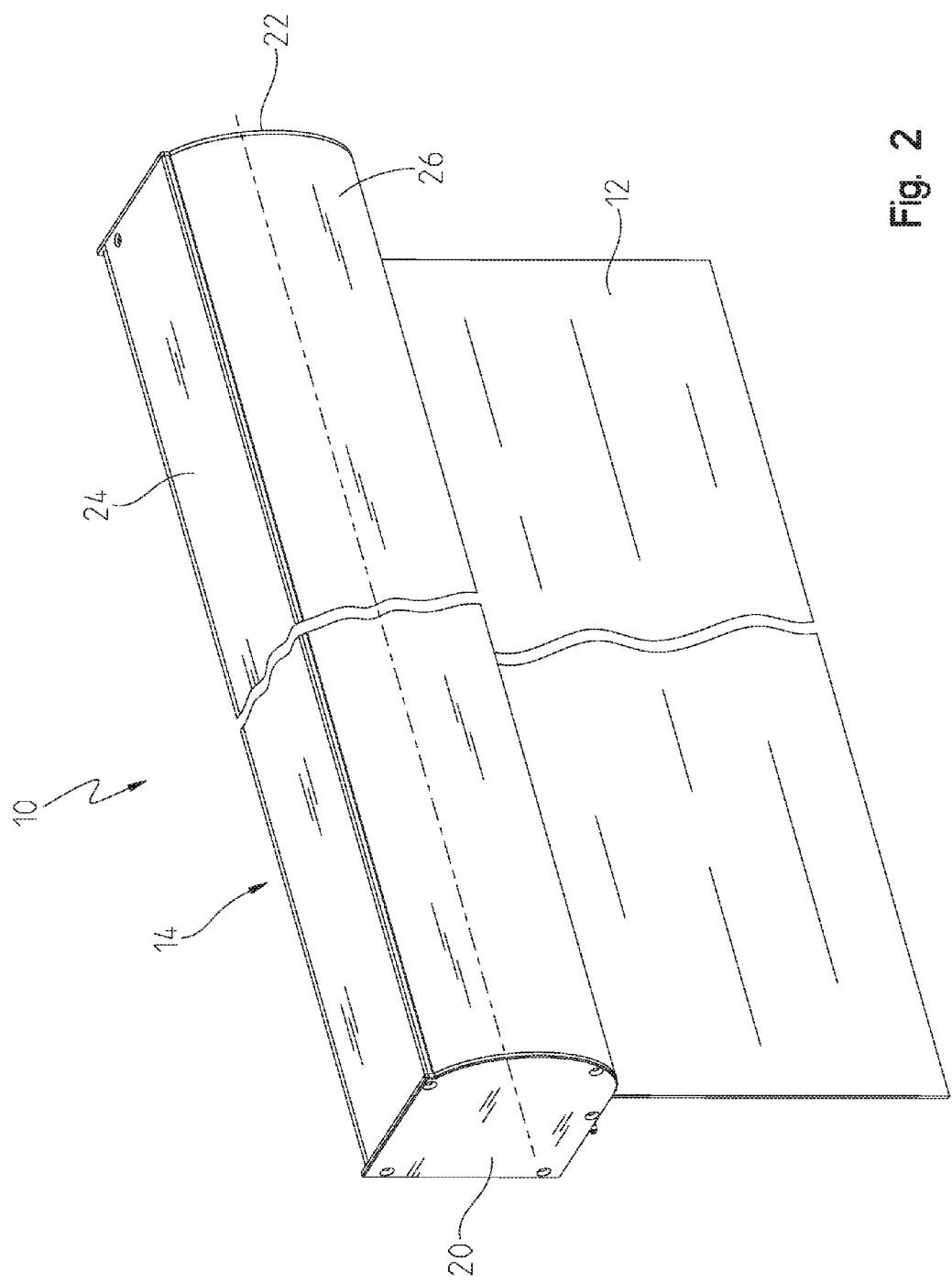
FIG. 2 illustrates a perspective view of the support system of FIG. 1 illustrating the rolled material being unwound from the roller in an extended configuration and extending vertically downward.
Figure 3:
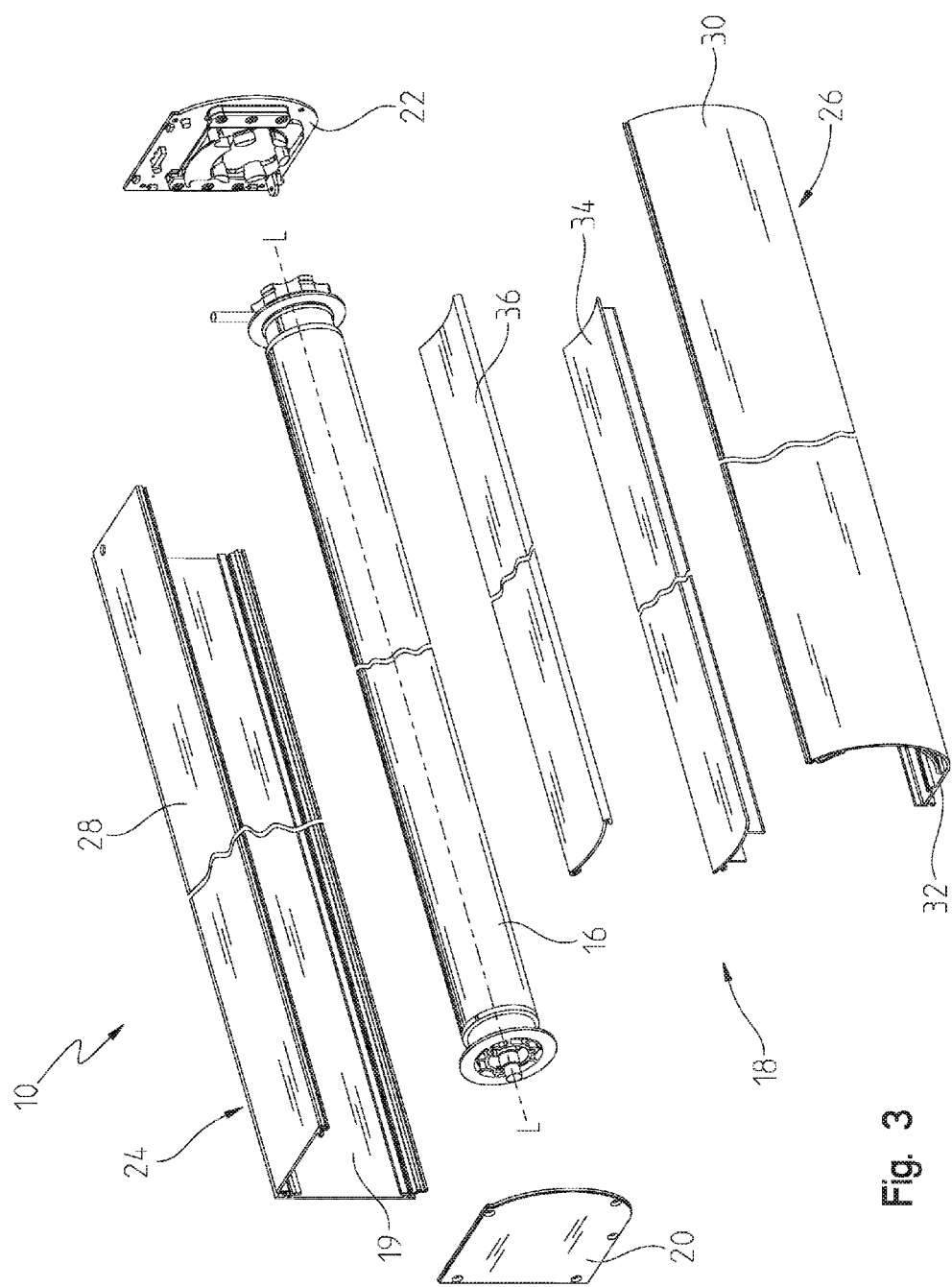
FIG. 3 illustrates a partial, exploded view of portions the support system of FIG. 1.

Referring to FIGS. 1-3, a support system 10 for a rolled material 12 moveable between a rolled configuration (FIG. 1) and an extended configuration (FIG. 2) is shown. In the rolled configuration a majority of the rolled material is wrapped around the roller. In the extended configuration a majority of the rolled material is not wrapped around the roller. In the extended configuration, the majority of the rolled material is unrolled and extending vertically downward from the roller as shown in FIG. 2.

Support system 10 generally includes a housing 14, a roller 16 positioned within housing 14, and a cradle 18. The roller has a longitudinal axis L. The cradle 18 extends along a first longitudinal length of roller 16 and is coupled to housing 14. In the illustrated embodiment, housing 14 is a multi-piece housing including a stationary member 24 which extends along longitudinal axis L, a cover member 26, a first end cap 20 coupled to a first end 21 of stationary member 24 and cover member 26, and a second end cap 22 coupled to a second end 23 of stationary member 24 and cover member 26.

In various embodiments, support system 10 may be a shade assembly and rolled material 12 may be a shade material, while in other various embodiments, support system 10 may be a projection screen assembly and rolled material 12 may be a projection screen. Exemplary shades include window shades, window screens, zipper shades having vertical sides with a plurality of protrusions which are retained in side channels mounted to a structure, and other materials which limit the passage of light or small objects (such as insects and other small objects) from a first side of the material to a second side of the material. Exemplary shade materials include fabric, plastic, plastic or wire meshes, and other suitable materials. Exemplary projection screens may be made of a number of materials suitable for projection screen applications. Preferably, a projection screen has a reflectivity gain from about 0.4 to about 2.5. Front projections screens are preferably white or light gray in appearance. Rear projection screens are preferably light gray in color and translucent to permit the projected image to transmit through the screen and be displayed to the audience. Some of the screens are acoustically transparent, like speaker cover fabric, to permit sound to be transmitted through the screen. According to one embodiment, a suitable projection screen includes a woven fiberglass backing with a vinyl reflective surface laminated to the fiberglass (gain of approximately 1.0). According to one embodiment, microscopic glass beads are provided on the viewing surface (gain from about 0.5 to about 2.5 depending on the viewing angle). According to another embodiment, the screen is made of a white (gain of about 1.0 or from about 0.4 to about 2.2 depending on the viewing angle) or light gray (gain of about 0.6 to 0.9 depending on the viewing angle) vinyl material without a backing Other suitable projection screens are known to those of ordinary skill in the art may also be provided. Preferably the screen is substantially blank so that it is substantially free of printing or other markings that noticeably detract from the images projected on the screen. According to one embodiment, the substantially blank screen is provided with black borders that frame the screen for "wide screen" or other projection formats.

Referring to FIGS. 3-6, housing 14 of support system 10 generally includes stationary member 24, cover member 26, first end cap 20, and second end cap 22. In other embodiments, housing 14 may include a single component, a fewer number of components, or a larger number of components. Stationary member 24 includes a rear panel 19 and a top panel 28. Stationary member is fastened or otherwise coupled to an environmental structure, such as a ceiling, a window frame, a wall, or other environmental structures. Cover member 26 includes a front panel 30 and a bottom panel 32. As shown in FIG. 5A, front panel 30 of cover member 26 is curved to allow space for rolled material 12 to accumulate about roller 16. Stationary member 24 and cover member 26 along with the remaining components of housing 14 may have any shape or surface finish.

Figure 5A:
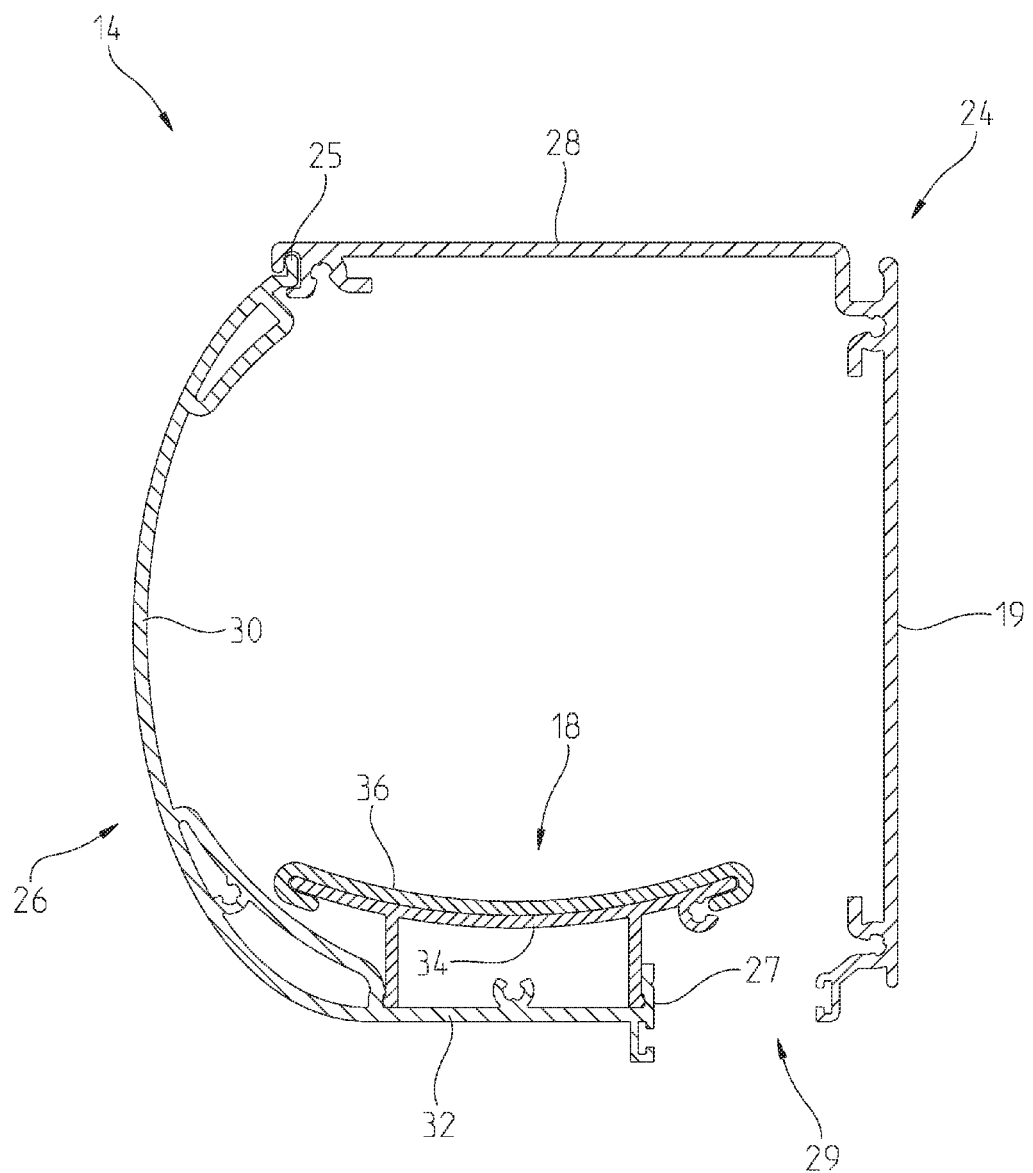
FIG. 5A illustrates a cross-sectional view of an embodiment of a housing and a cradle of the support system of FIG. 1 taken along line 5A-5A of FIG. 1.

Cover member 26 is removably coupled to stationary member 24 in the illustrated embodiment. Referring to FIGS. 5A-B, a portion of cover member 26 is nested within a portion of stationary member 24. More particularly, a first end 25 of cover member 26 is nested within a portion of stationary member 24 such that a dispensing passage 29 remains between stationary member 24 and a second end 27 of cover member 26 (FIG. 5A), Referring to FIG. 6, in various embodiments, dispensing passage 29 may be positioned about a bottom side or surface of housing 14 and rearward of the longitudinal axis of roller 16. In one embodiment, cover member 26 may be coupled to stationary member 24 about a hinge or a snap fit. Additionally, stationary member 24 and cover member 26 may be formed of an integral piece including a living hinge to allow cover member 26 to fold down and conceal roller 16.

Figure 8A:
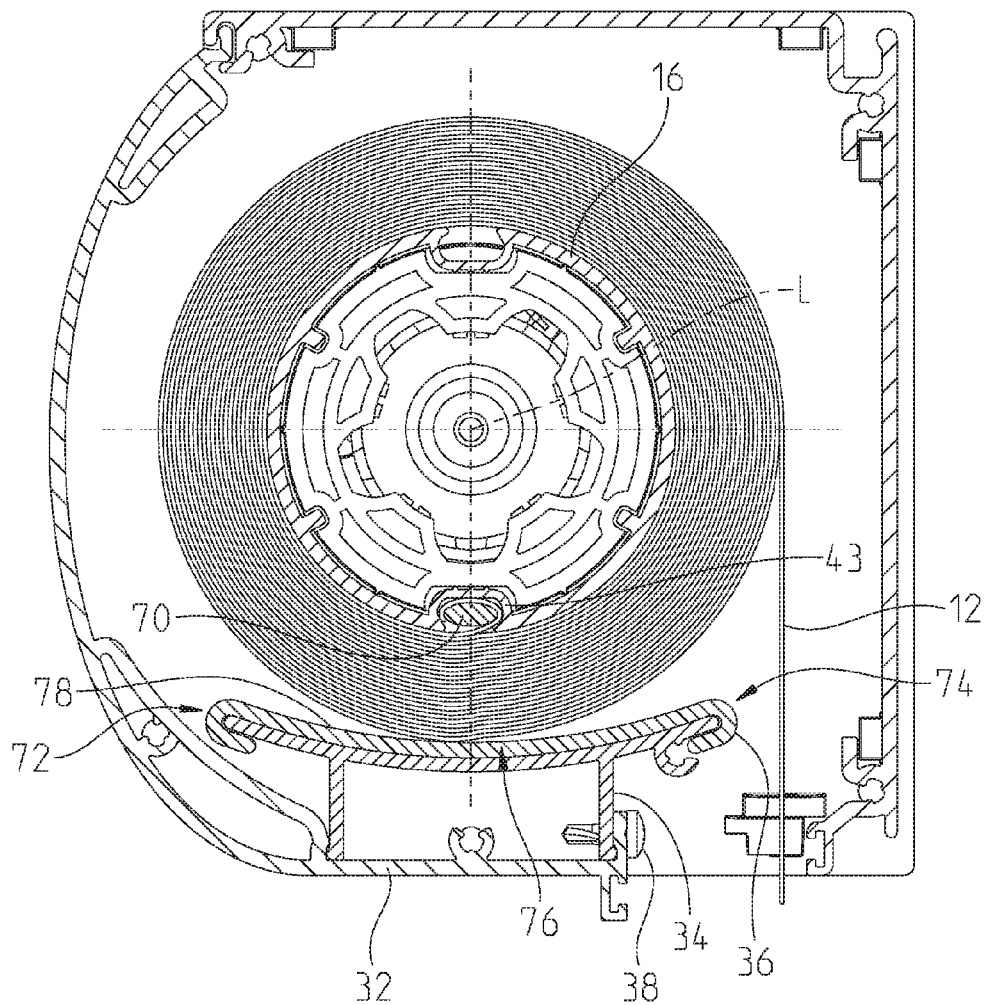
FIG. 8A illustrates a partial, view of the support system of FIG. 1 along lines 5A-5A in FIG. 1 towards a first end of the housing and with the rolled material in a rolled configuration.

Referring to FIGS. 4, 7 and 8A-B, cradle 18 is positioned to support roller 16 and the rolled material 12 wound on roller 16. In the illustrated embodiment, cradle 18 includes a base 34 and a contact member 36. Base 34 is removeably coupled to housing 14. As shown in FIG. 8A, one or more fasteners 38 may secure base 34 to housing 14. In one embodiment, cradle 18 is coupled to bottom panel 32 of cover member 26 via two screws, one at each end of base 34. Base 34 may be secured to housing 14 with fasteners, adhesives, press fit, interlocking features, and other suitable methods of coupling the base to the housing.

As shown in FIG. 8A, contact member 36 is supported by base 34. Contact member 36 includes a first end section 72, a second end section 74, and a middle section 76 which has an arcuate contour. End sections 72 and 74 include openings to receive a portion of base 34. In the illustrated embodiment, contact member 36 is slideable relative to base 34 along longitudinal axis L and is secured to base 34 with fasteners or other suitable mechanisms to hold contact member 36 relative to base 34. A upper surface 78 of middle section 76 of contact member 36 supports rolled material 12. In one embodiment, upper surface 78 is an uninterrupted surface which has no edges or discontinuities that could mar rolled material 12.

Figure 8B:
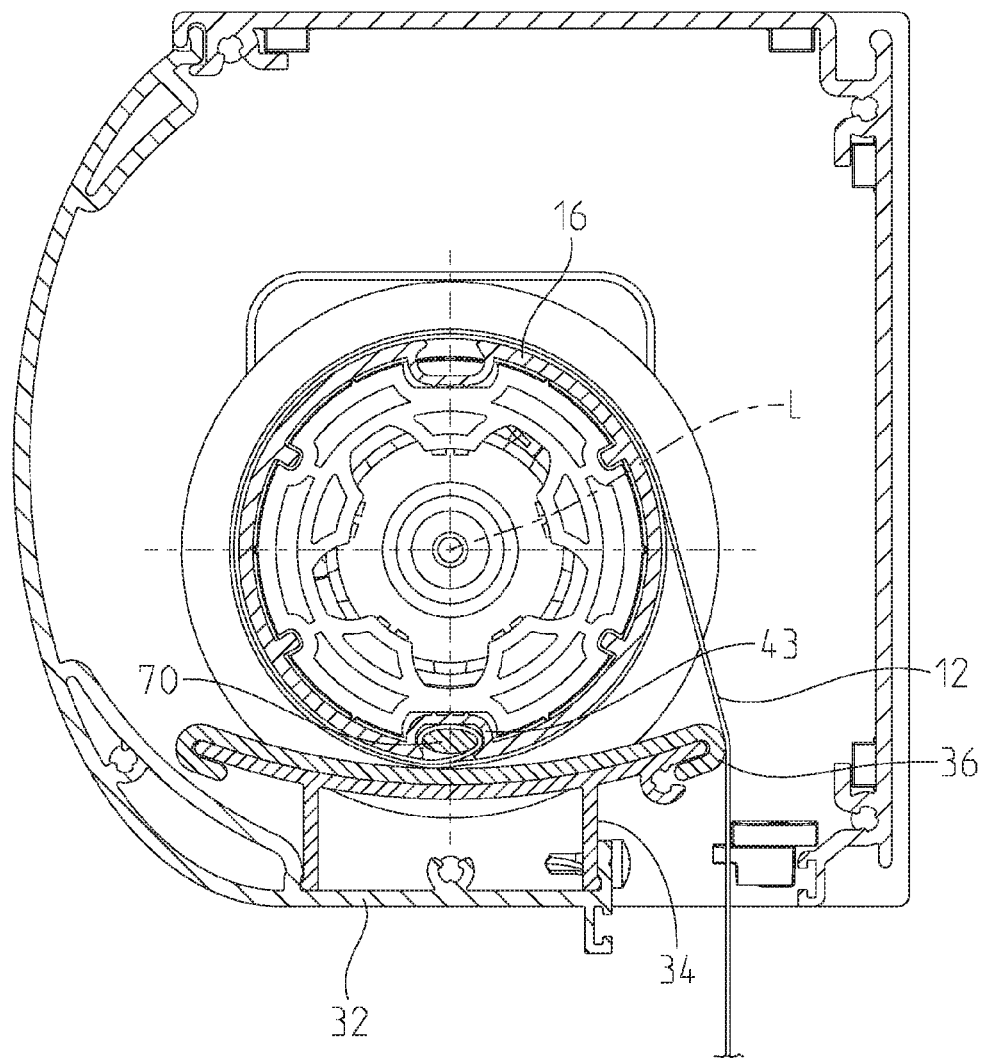
FIG. 8B illustrates the view of FIG. 8A with the rolled material in an extended configuration.
Figure 8C:
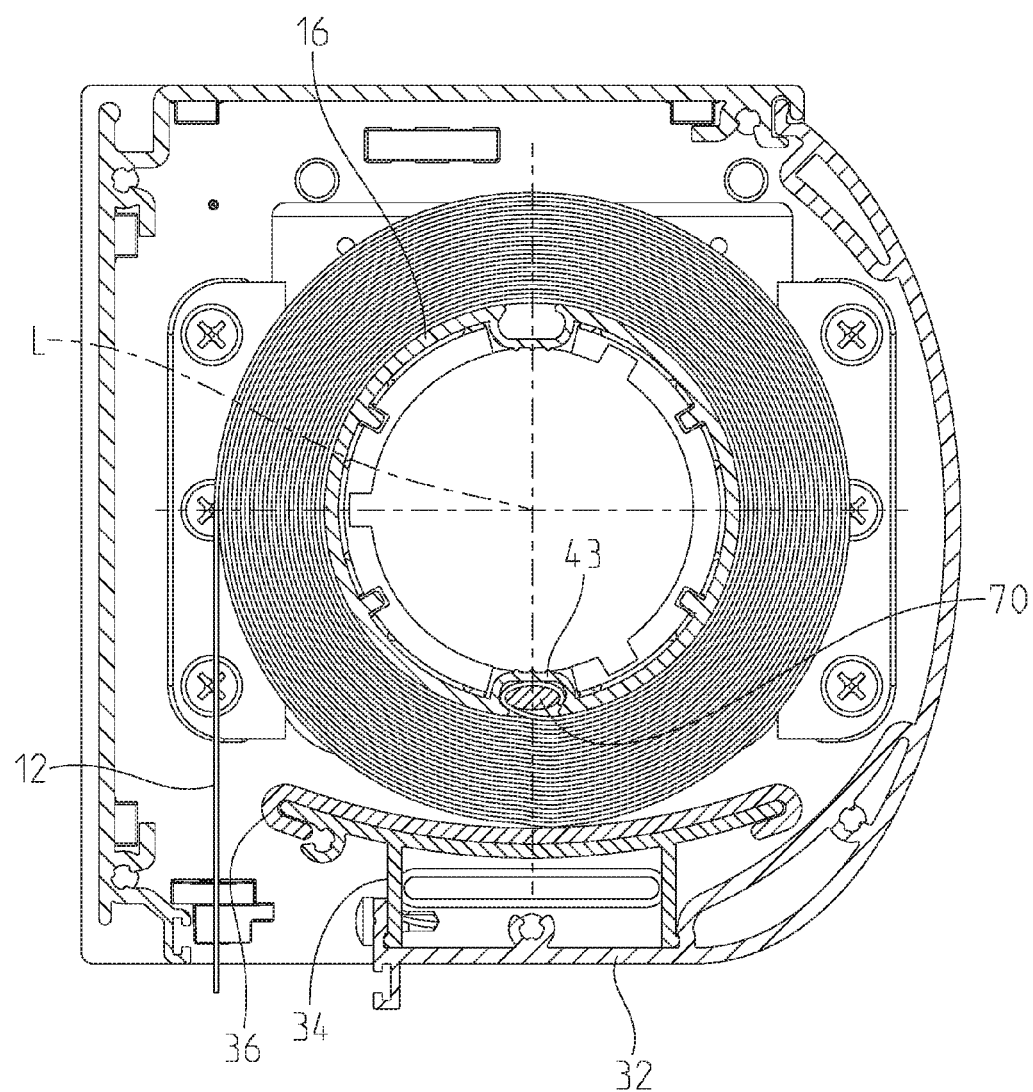
FIG. 8C illustrates a partial, view of the support system of FIG. 1 along lines 5A-5A in FIG. 1 towards a second end of the housing and with the rolled material in a rolled configuration.
Figure 8D:
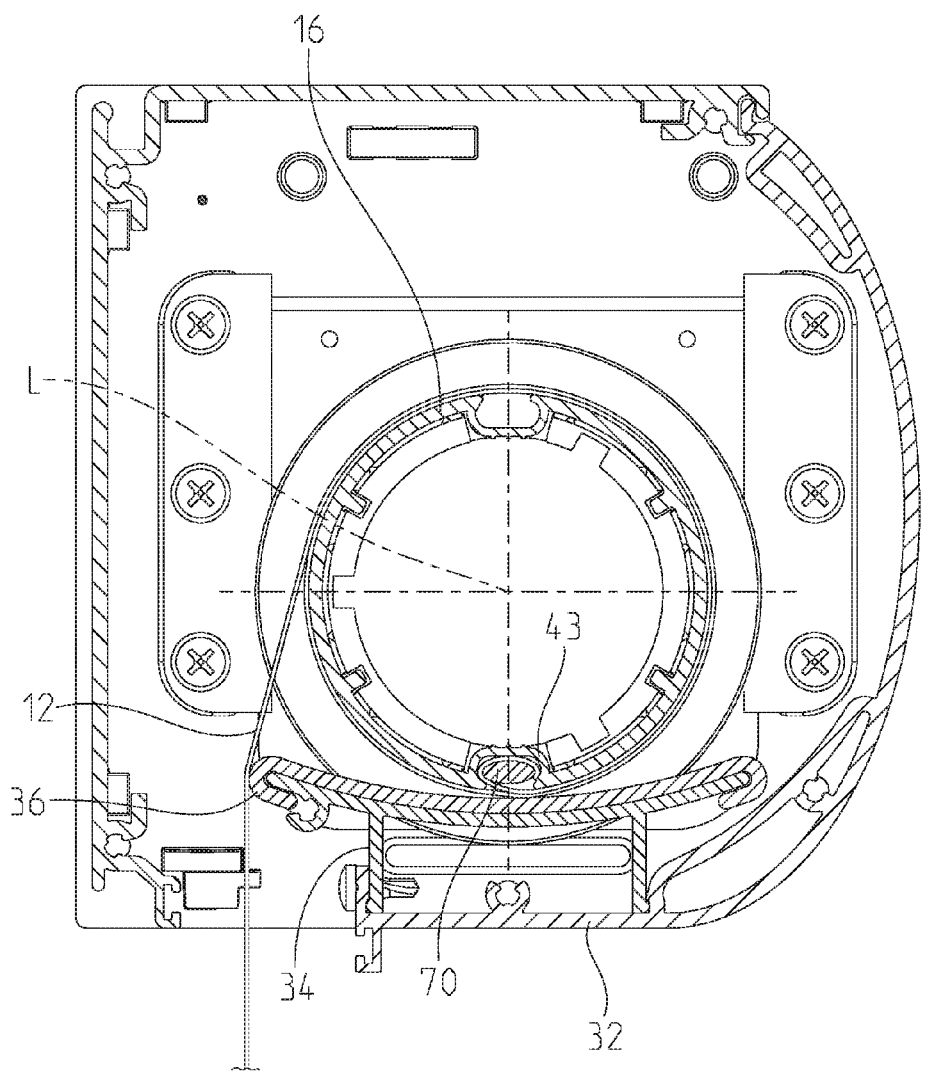
FIG. 8D illustrates the view of FIG. 8C with the rolled material in an extended configuration.

Still referring to FIGS. 4, 7 and 8A-B, contact member 36 and base 34 are positioned directly below longitudinal axis L of roller 16 to support roller 16 in a vertical direction in both the rolled configuration (FIGS. 8A and 8C) and the extended configuration (FIGS. 8B and 8D). In the illustrative embodiment, a center of contact member 36 and base 34 is positioned vertically below longitudinal axis L of roller 16. In other embodiments, the center of one or both of base 34 and contact member 36 may be positioned other than directly below the longitudinal axis L of roller 16.

Contact member 36 and base 34 remain stationary as rolled material 12 moves between the rolled configuration, when a majority of rolled material 12 is wrapped around roller 16 (FIGS. 8A and 8C), and the extended configuration, when a majority of rolled material 12 is unwound from roller 16 and extends vertically downward from roller 16 (FIGS. 8B and 8D).

Figure 9:
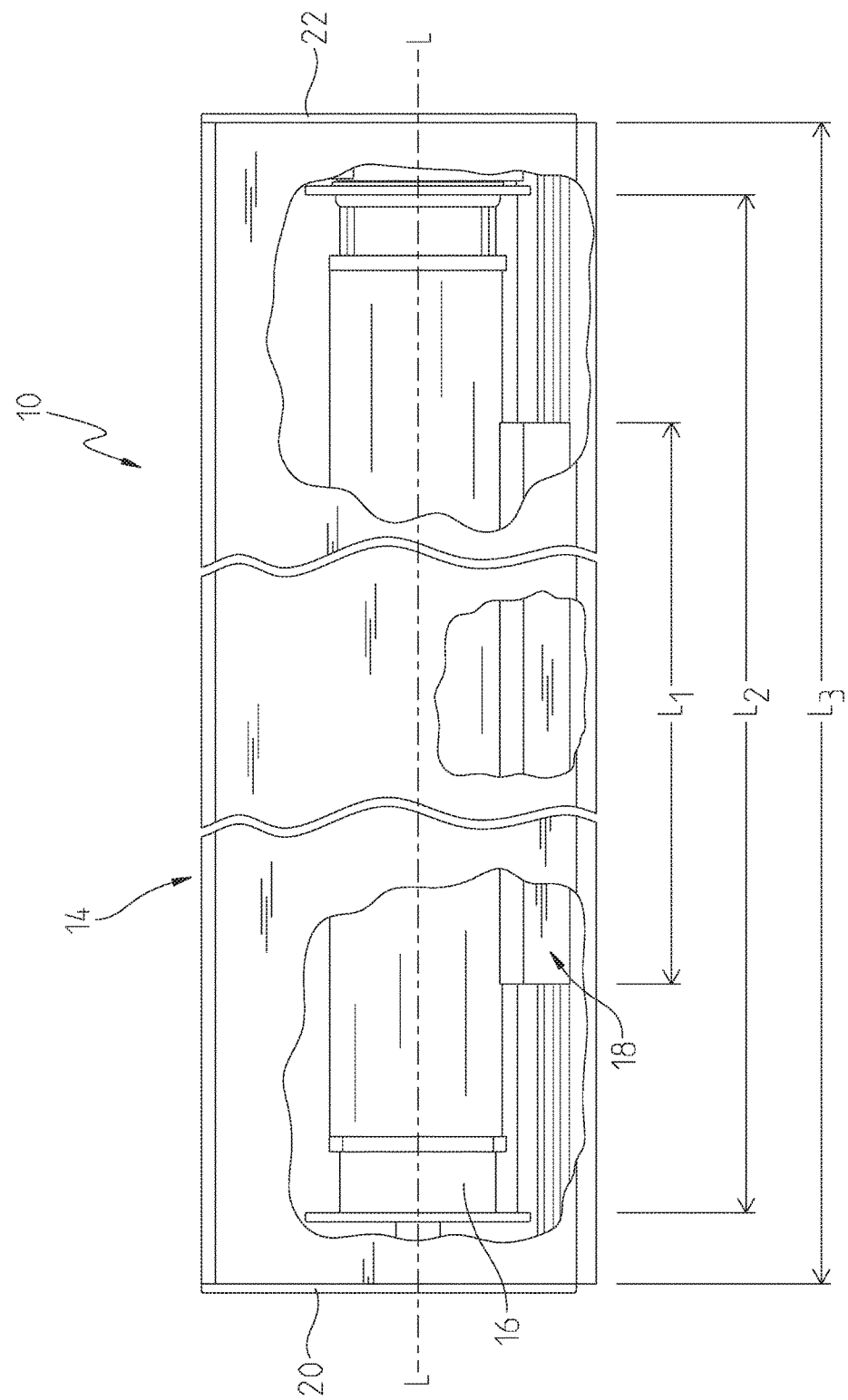
FIG. 9 illustrates a partial, front view of the support system of FIG. 1 with portions of a housing of the support system cutout.

Referring to FIG. 9, cradle 18 generally includes a longitudinal length $L_1$. In various embodiments, longitudinal length $L_1$ of cradle 18 may be shorter than a longitudinal length $L_3$ of housing 14. In other various embodiments, longitudinal length of cradle 18 $L_1$ may be longer than a longitudinal length $L_2$ of roller 16. Longitudinal length $L_2$ of roller 16 corresponds to the portion of the roller 16 adapted to receive the rolled material.

Figure 14:
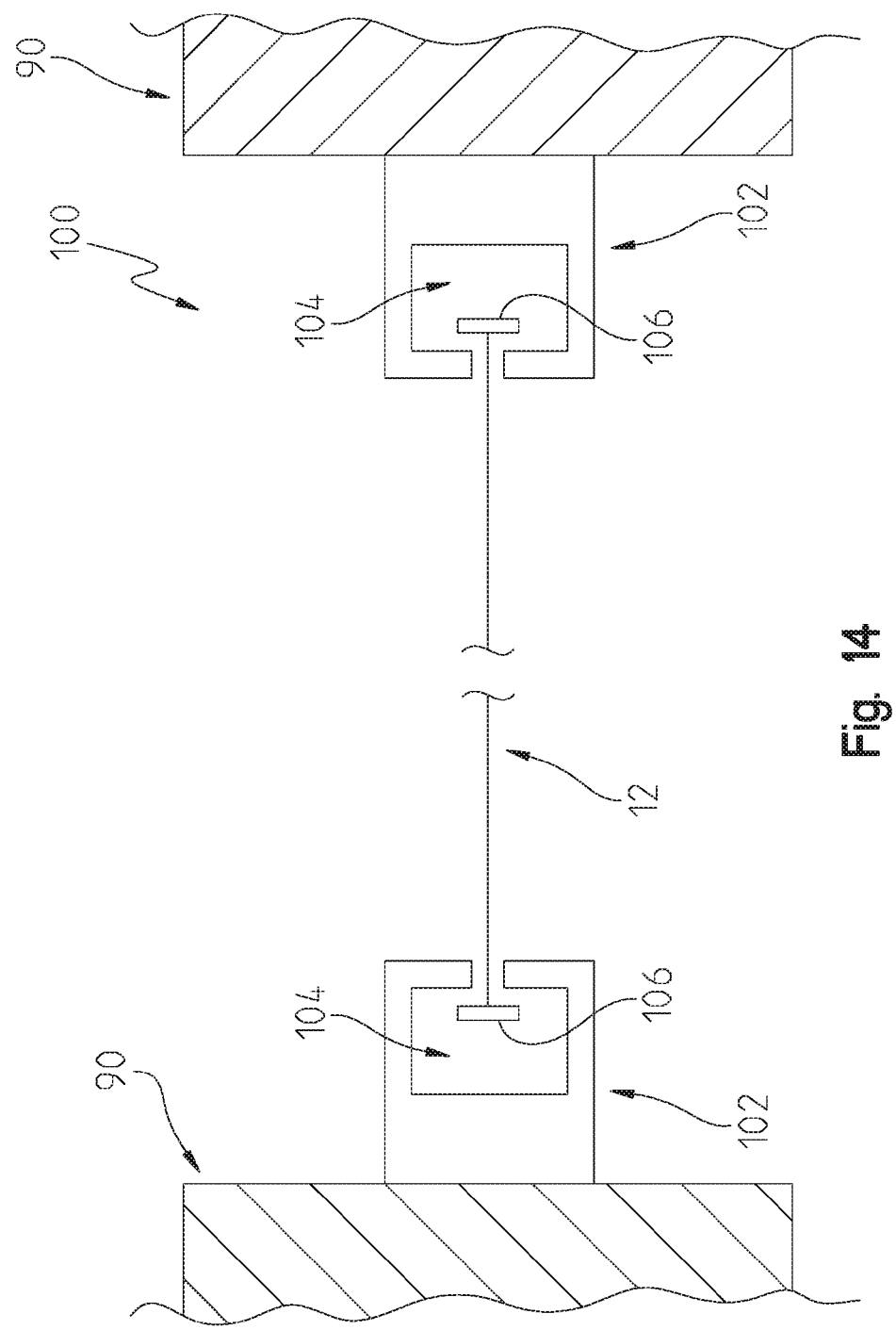
FIG. 14 illustrates an exemplary rolled material including a plurality of protrusions along each of a first vertical edge and a second vertical edge, the plurality of protrusions being captured in the interiors of side channels which receive the plurality of protrusions at the rolled material moves towards the extended configuration.

In one example, when support system 10 is a projection screen assembly, longitudinal length $L_1$ of cradle 18 may be longer or substantially equal in length to longitudinal length $L_2$ of roller 16. In other various embodiments, longitudinal length $L_1$ of cradle 18 may be shorter than both longitudinal length $L_3$ of housing 14 and longitudinal length $L_2$ of roller 16. In one example, when support system 10 is a zipper shade assembly 100 (see FIG. 14), each end of cradle 18 may be approximately three to six inches shorter than roller 16 to allow a zipper edge of the shade to accumulate about the ends of roller 16 without interfering with cradle 18. As shown in FIG. 14, zipper shade assembly 100 includes side channels 102 which are attached to an environmental structure 90 and are positioned below housing 14 of support system 10. The vertical ends of rolled material 12 include a plurality of protrusions 106 which are received in interiors 104 of side channels 102. The side channels 102 capture the plurality of protrusions to hold the rolled material proximate to environmental structure 90. Exemplary protrusions 106 include zipper teeth or other suitable protrusions.

Figure 4:
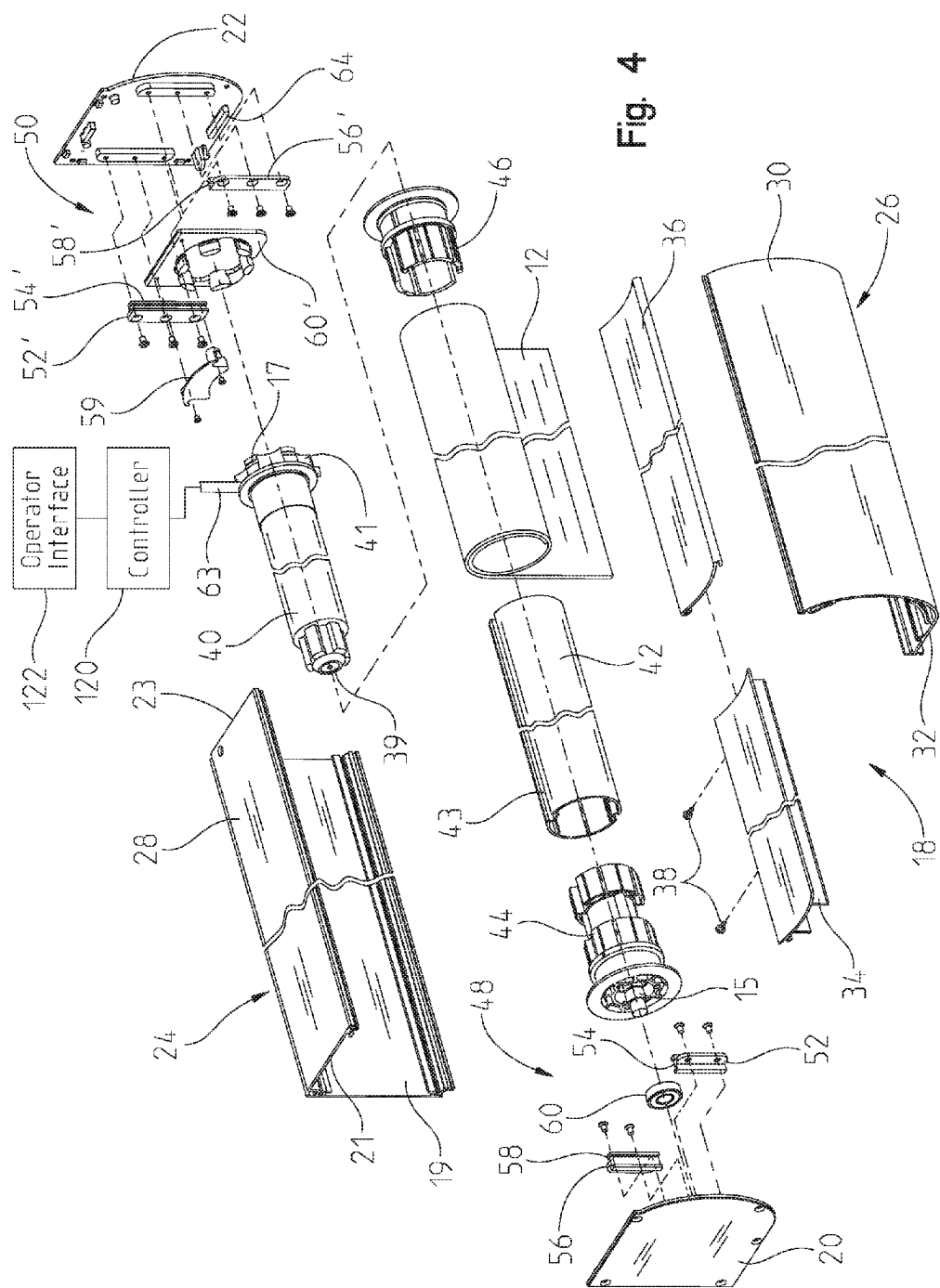
FIG. 4 illustrates further exploded view of the support system of FIG. 3 and rolled material.
Figure 10:
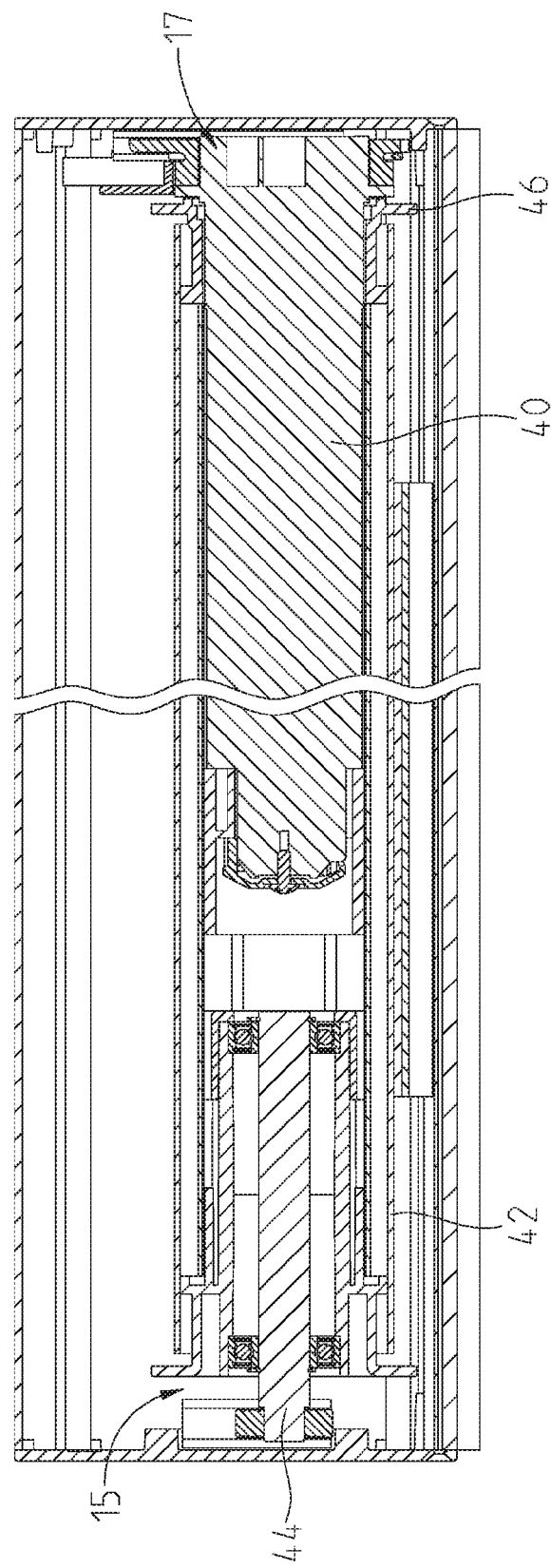
FIG. 10 illustrates a partial, cross-sectional view of the support system of FIG. 1 taken along line 10-10 of FIG. 1.

Referring now to FIGS. 4 and 10, roller 16 generally includes a tubular motor 40 positioned within a spline tube 42. Spline tube 42 includes an indentation 43 such that rolled material 12 may be coupled to spline tube 42 within indentation 43. As shown in FIG. 8A, in one embodiment rolled material 12 is coupled to a hem bar 70 that is received in one of the indentations 43. In the illustrated embodiment, roller 16 also includes a gudgeon assembly 44 coupled to a first end 39 of tubular motor 40 and nested within spline tube 42. In the illustrated embodiment, roller 16 further includes an adaptor 46 coupled to a second end 41 of tubular motor 40 and spline tube 42.

With reference to FIGS. 4, 11A-C, and 12A-C, first end 15 of roller 16 is coupled to first end cap 20 through a first mount 48 and second end 17 of roller 16 is coupled to second end cap 22 through a second mount 50. In general, first mount 48 and second mount 50 each include a first longitudinal member 52 having a first channel 54, a second longitudinal member 56 having a second channel 58, and a coupling member 60 positioned within first channel 54 and second channel 58. Longitudinal members 42 and 56 may be coupled to end caps 20 and 22 via a plurality of couplers 65. In the illustrated embodiment, coupling member 60 of first mount 48 is a bearing, while coupling member 60' of second mount 50 is a sled member including a plurality of protrusions 62 configured to mate with adaptor 46 of roller 16.

Figure 12A:
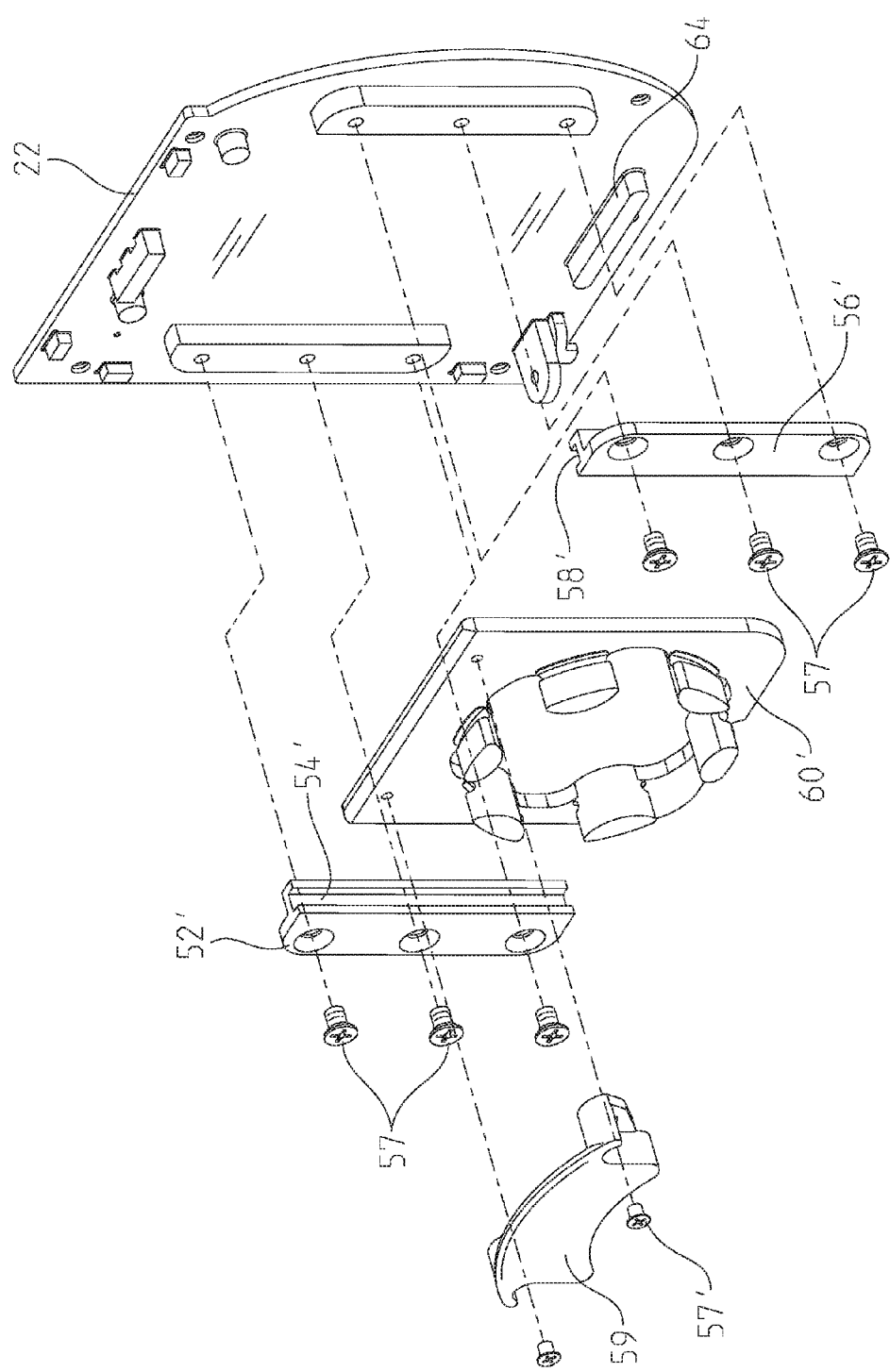
FIG. 12A illustrates an exploded view of a second end cap and a second end mount of the support system of FIG. 1.
Figure 12B:
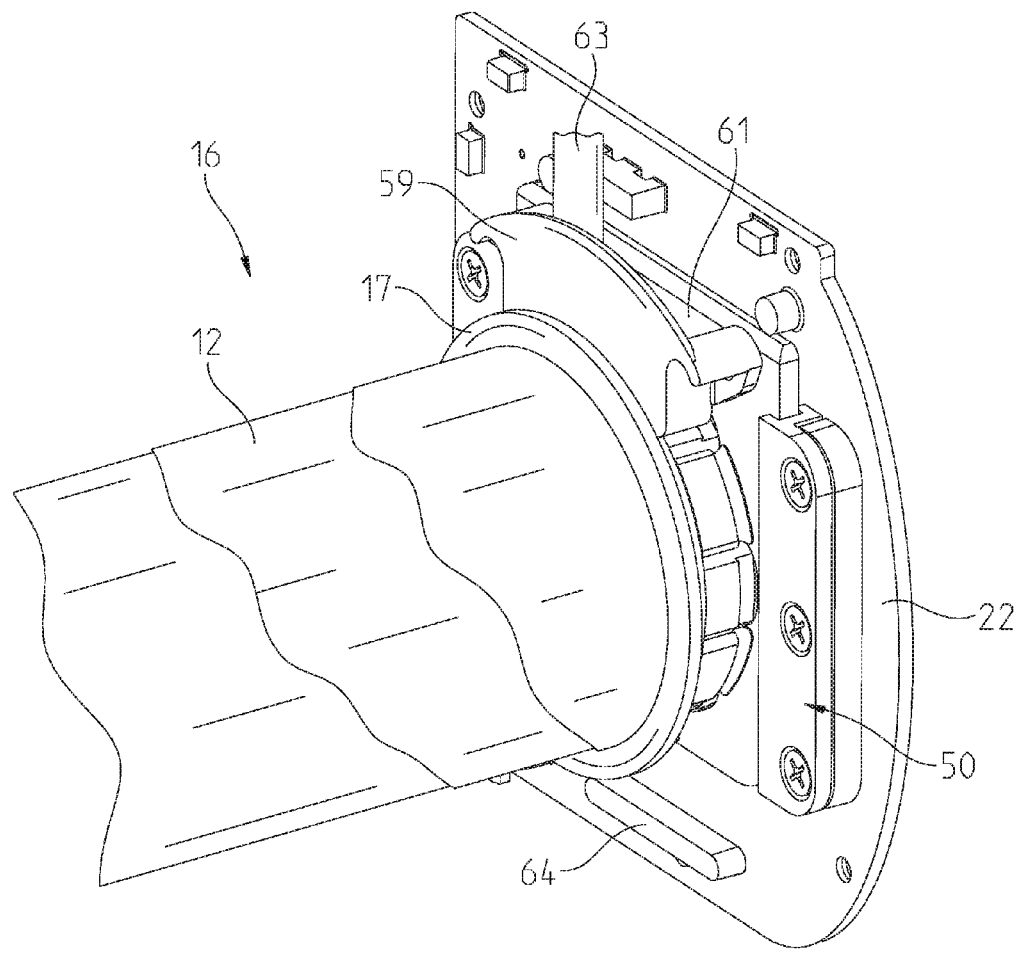
FIG. 12B illustrates a perspective view of the second end cap and the second end mount of FIG. 12A with a roller of the support system of FIG. 1 and the rolled material in a rolled configuration.
Figure 12C:
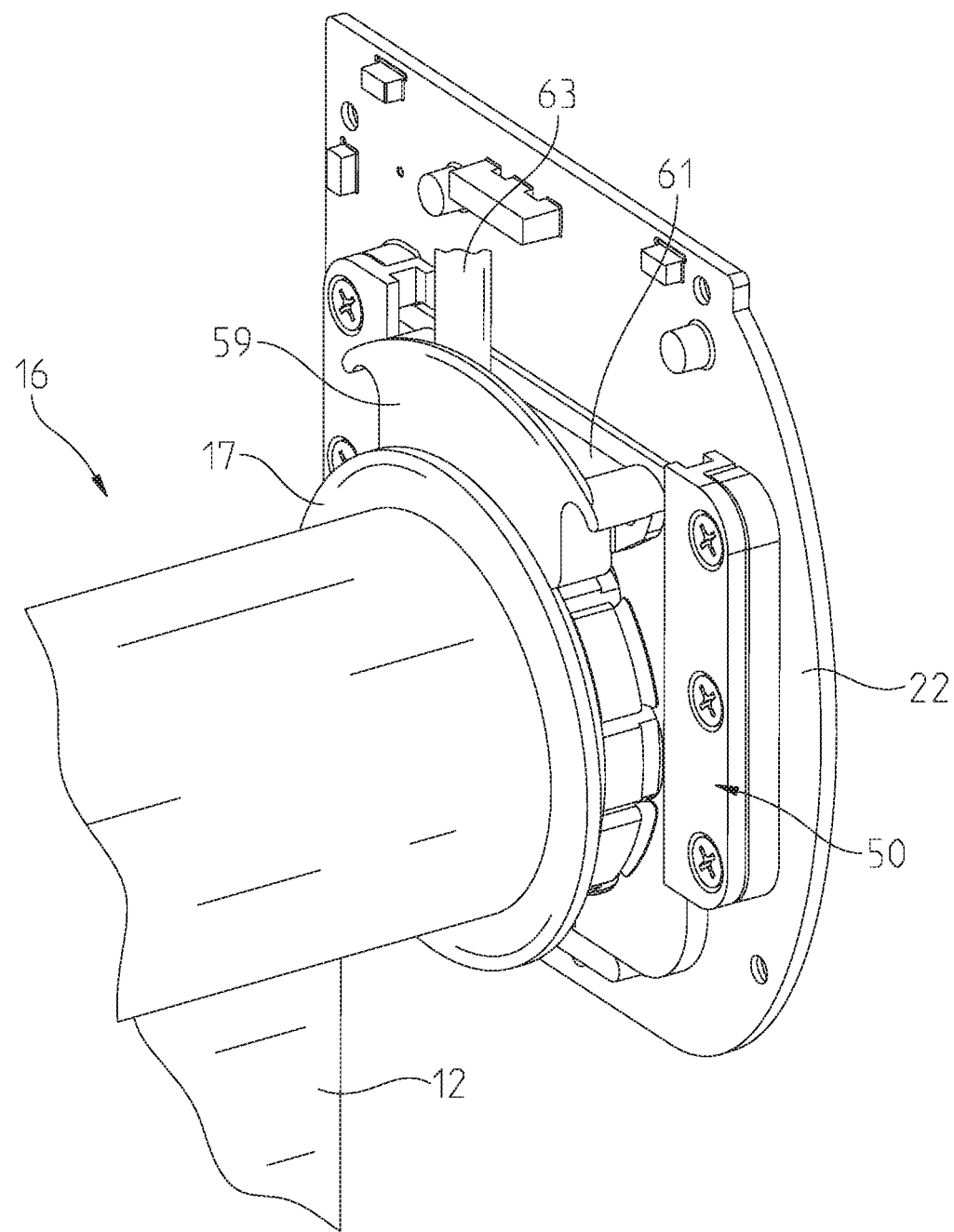
FIG. 12C illustrates a perspective view of the second end cap and the second end mount of FIG. 12A with a roller of the support system of FIG. 1 and the rolled material in an extended configuration.
Figure 13A:
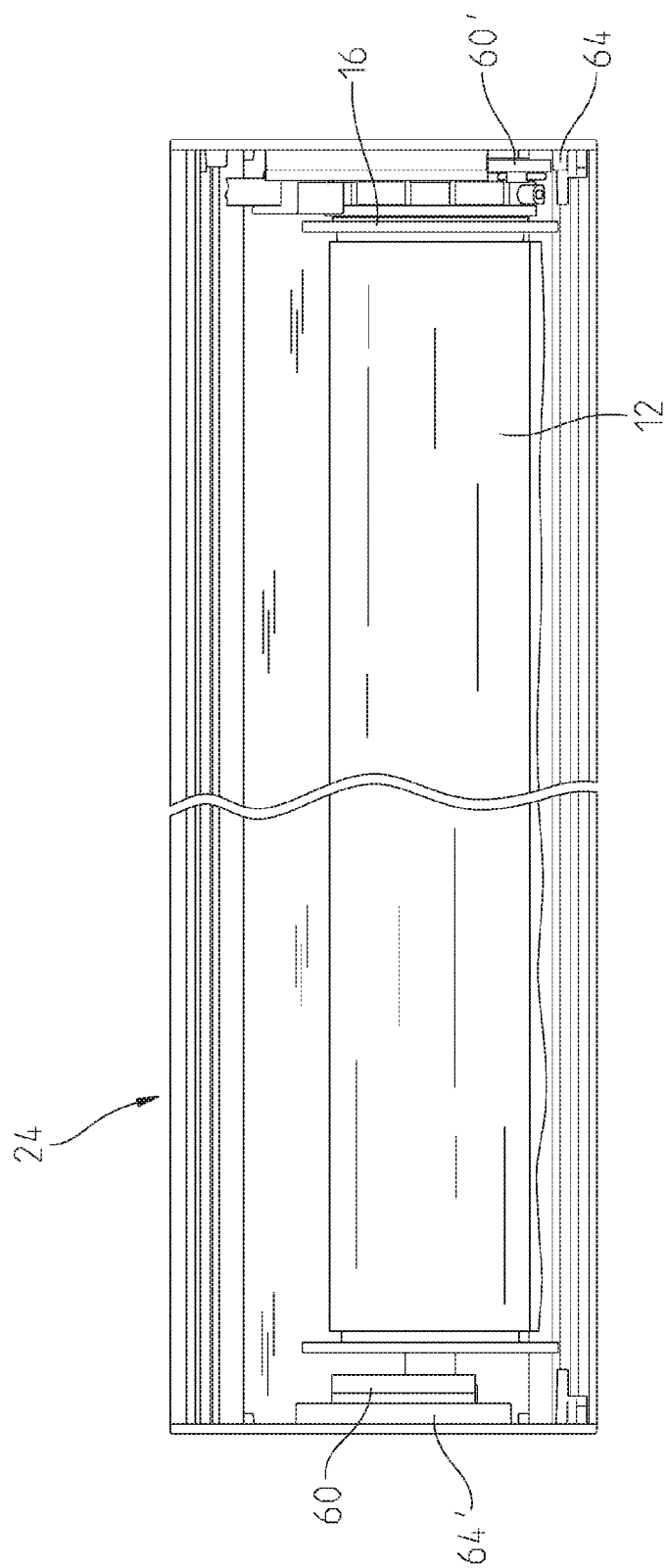
FIG. 13A illustrates a partial, perspective view of the support system of FIG. 1 with a cover member removed and the rolled material in a rolled configuration.
Figure 13B:
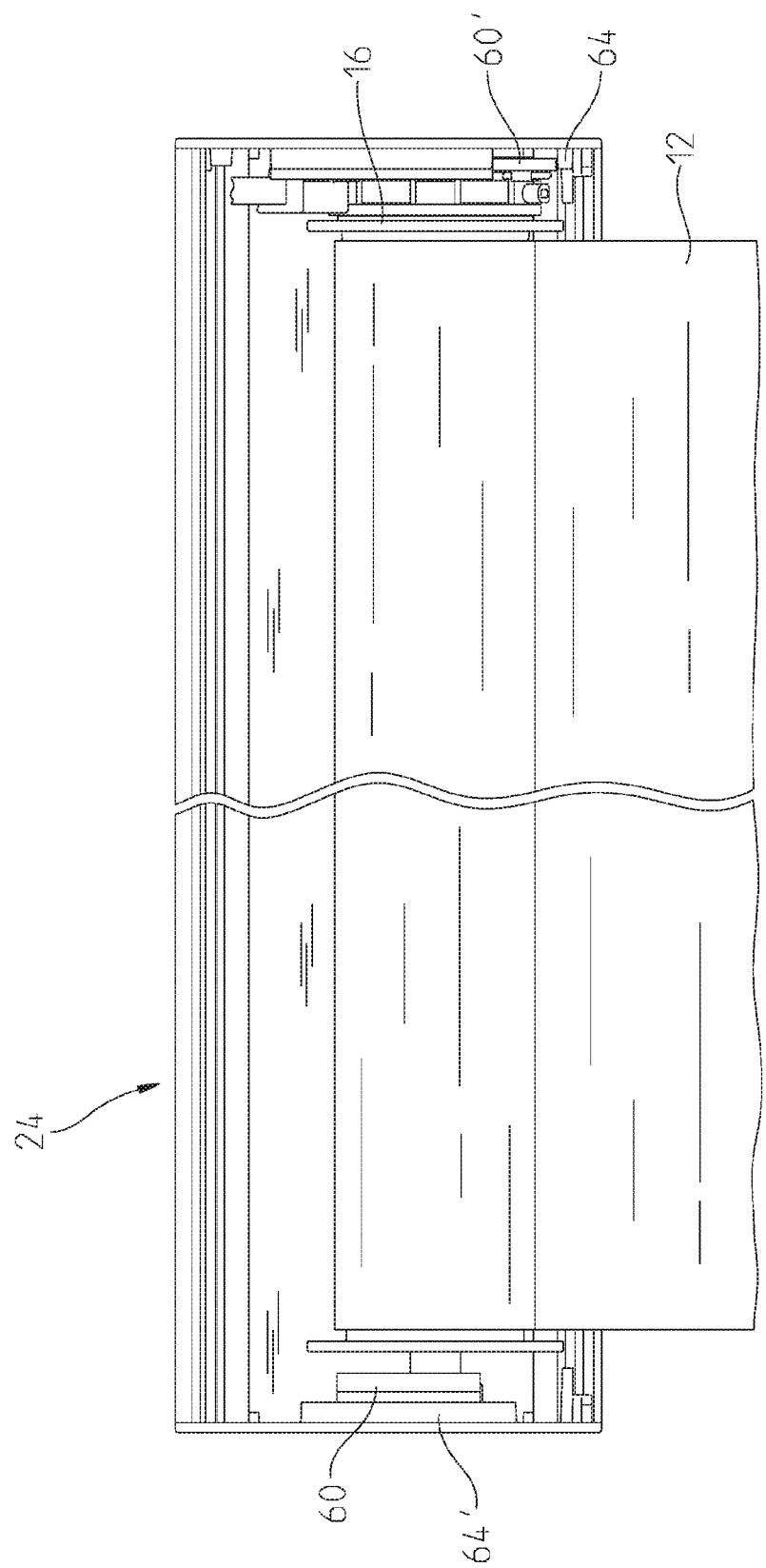
FIG. 13B illustrates a perspective view of the support system of FIG. 2 with a cover member removed and the rolled material in an extended configuration.

Still referring to FIGS. 12A-C, in addition, in various embodiments, second mount 50 may further include a cable guide 59 having an opening 61 (FIG. 12B) that allows a power cable 63 of tubular motor 50 to pass through opening 61 such that power cable 63 is retained within opening 61 to keep cable 63 from contacting roller 16. Cable guide 59 may be coupled to coupling member 60' via at least one coupler 65'.

Referring to FIGS. 4, 11A-C, 12A-C and 13A-B, first end cap 20 and second end cap 22 may both include a stop member 64. Stop member 64 may be configured to support roller 16 in both the rolled configuration (FIG. 13A) and the extended configuration (FIG. 13B) when cradle 18 is not supporting roller 16. For example, when cover member 26 is removed from support system 10 such that parts of system 10 may be worked on or contact member 36 and/or base 34 may be replaced, and cradle 18 is thus removed from system 10, roller 16 would be unsupported by cradle 18. In this instance, stop members 64 and 64' would support roller 16 within support system 10 such that roller 16 may remain engaged with system 10 even when cradle 18 and cover member 26 are removed. In the illustrative embodiment, stop member 64 is positioned vertically below first mount 48 and stop member 64' is positioned vertically below second mount 50.

Support system 10 may be assembled in the following manner. Adaptor 46 is coupled to tubular motor 40. Second mount 50 is assembled by coupling first and second longitudinal members 52', 56' to second end cap 22 via a plurality of couplers 65, and positioning coupling member 60' within channels 54 and 58 of first and second longitudinal members 52' and 56'. Tubular motor 40 is then coupled to second end cap 22 via coupling member 60' of second mount 50 and adaptor 46 coupled to tubular motor 40. Subsequently, cable guide 59 is coupled to coupling member 60' via couplers 65' such that power cable 63 is positioned within cable guide 59. Tubular motor 40 is positioned within spline tube 42, stationary member 24 is introduced, and end cap 22 is coupled to stationary member 24. First mount 48 is assembled by coupling first and second longitudinal member 52 and 56 to first end cap 20 via a plurality of couplers 65 and placing coupling member 60 within first and second channels 54 and 58 of first and second longitudinal member 52 and 56. Gudgeon assembly 44 is coupled to first mount 48 through coupling member 60 and then positioned within spline tube 42. First end cap 20 is coupled to stationary member 24. Contact member 36 is coupled to base 34 by sliding contact member 36 over base 34. Base 34 is coupled to cover member 26 via at least one coupler 38. First end 25 of cover member 26 may be nested within a portion of stationary member 24 such that a dispensing passage 29 remains between stationary member 24 and a second end 27 of cover member 26 and roller 16 is supported by cradle 18. Of course the assembly of support system 10 may be performed in alternative orders of operation.

Figure 11A:
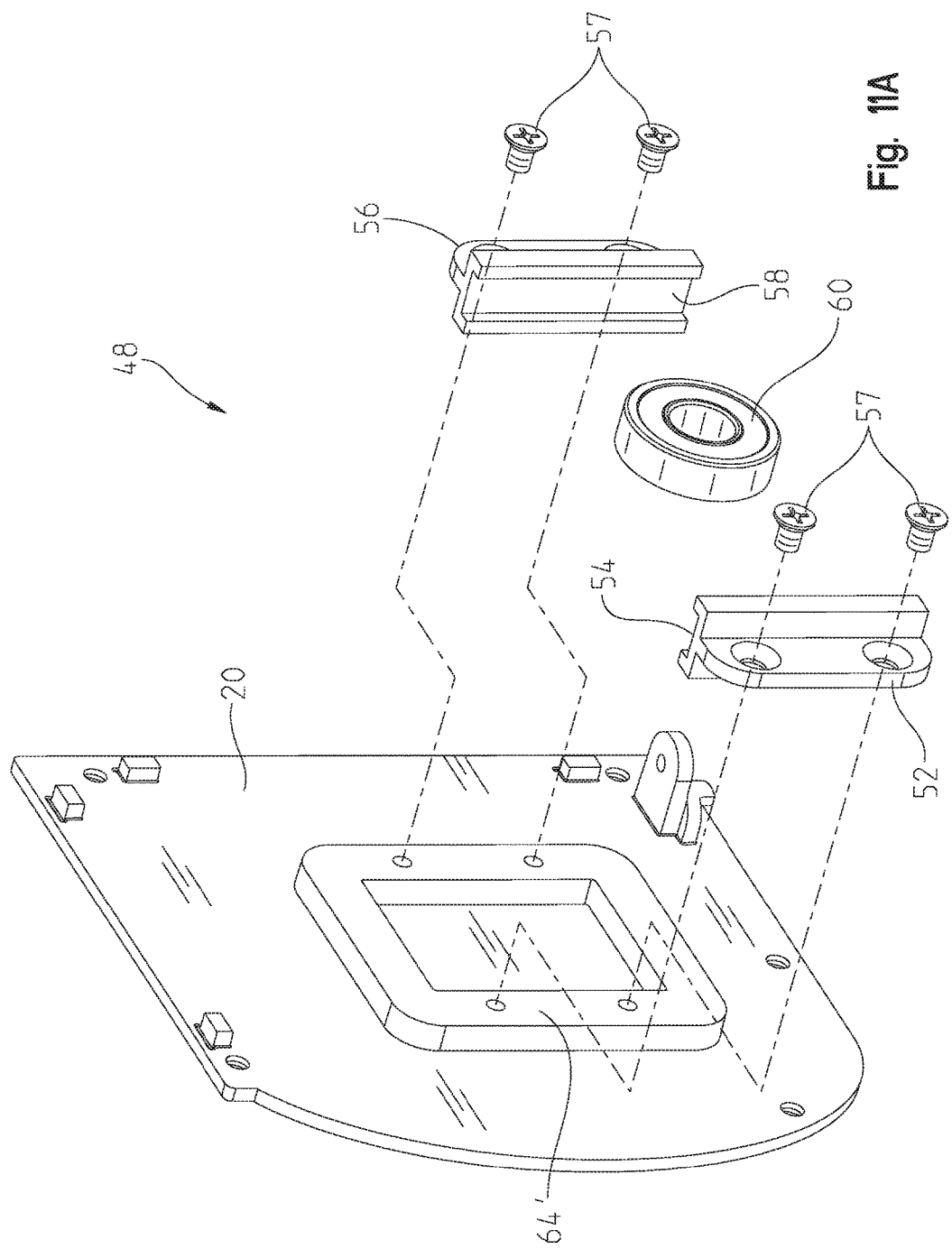
FIG. 11A illustrates is an exploded view of a first end cap and a first end mount of the support system of FIG. 1.
Figure 11B:
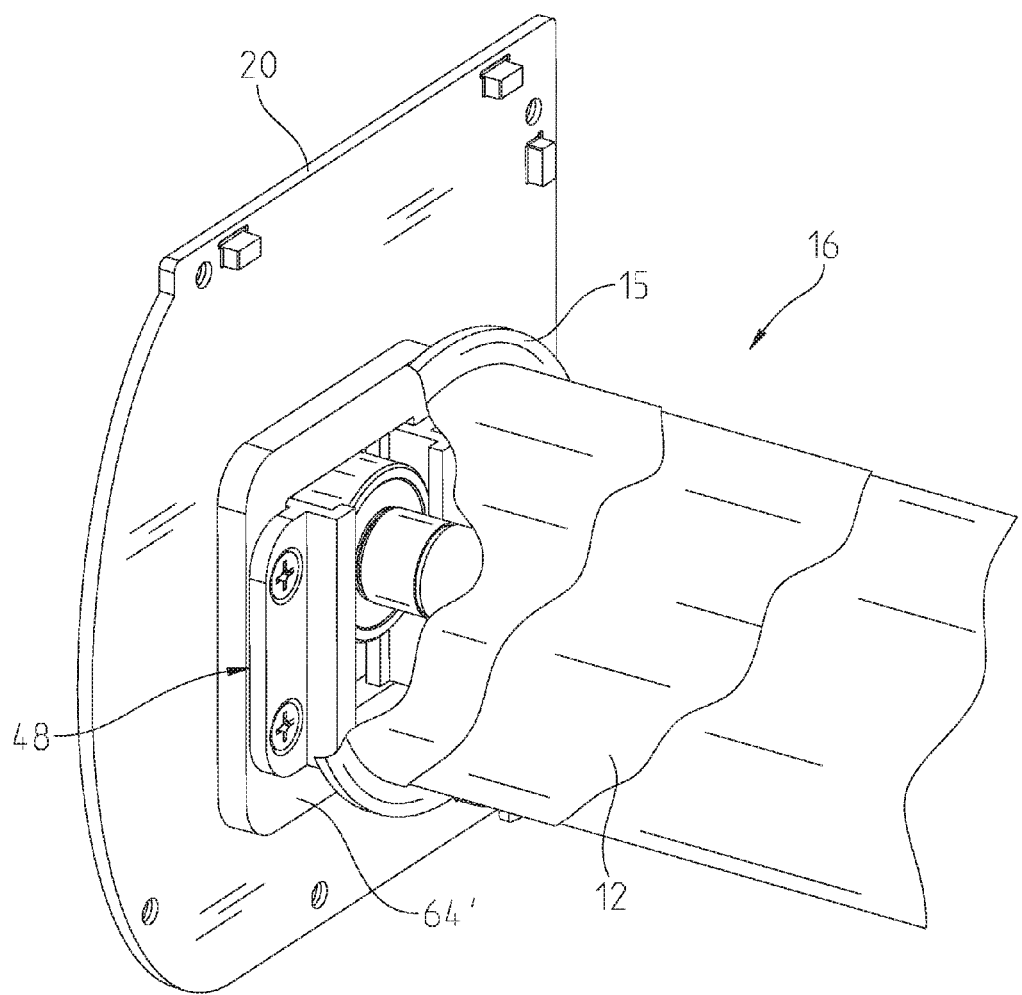
FIG. 11B illustrates a perspective view of the first end cap and the first end mount of FIG. 11A with a roller of the support system and rolled material of FIG. 1.
Figure 11C:
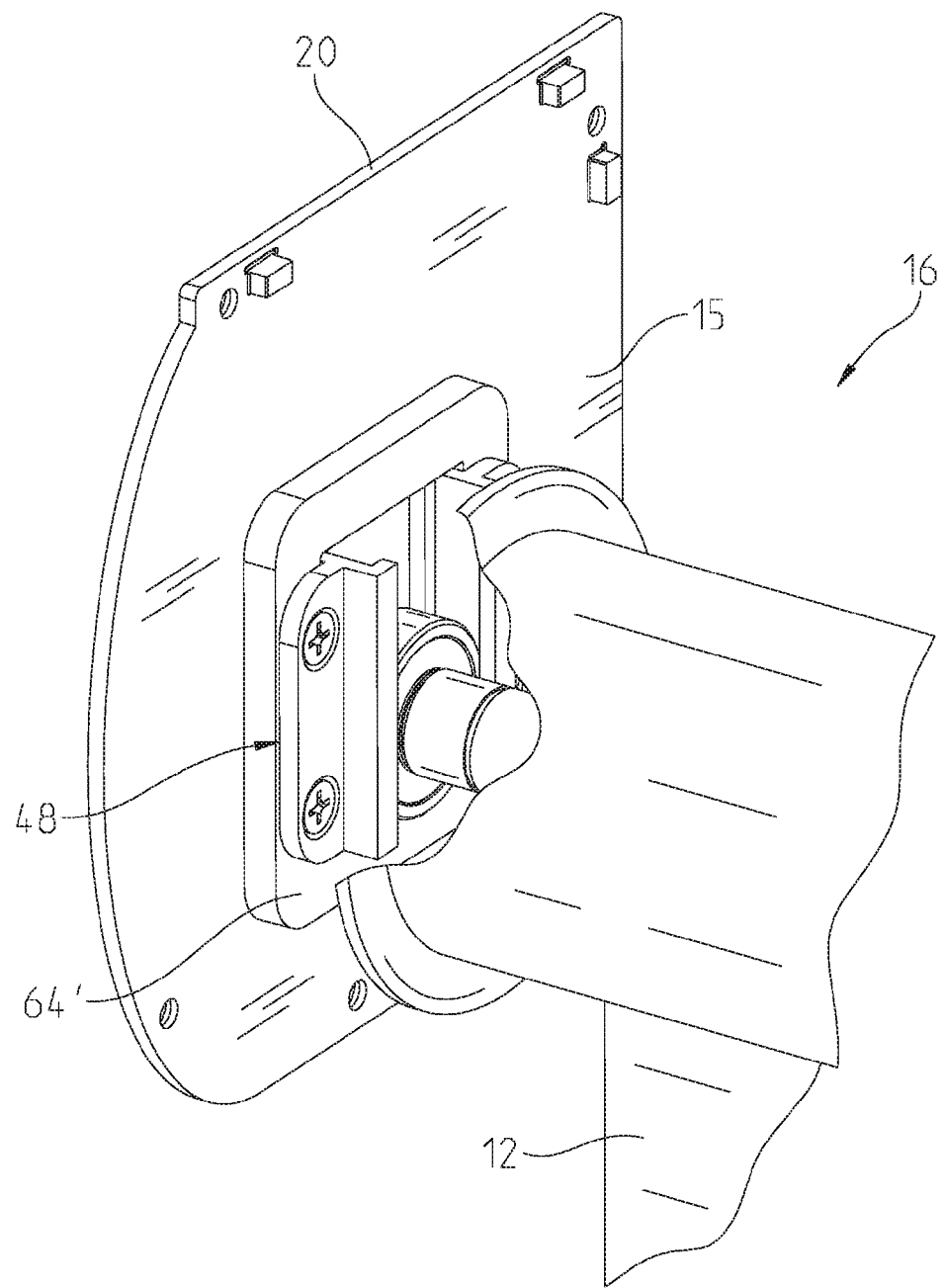
FIG. 11C illustrates a perspective view of the first end cap and the first end mount of FIG. 11A with a roller of the support system of FIG. 1 with the rolled material in an extended configuration.

In operation, support system 10 is provided to a user. When in use, support system 10 may receive a plurality of signals for converting rolled material 12 between rolled (FIGS. 11B and 12B) and extended configurations (FIGS. 11C and 12C). For instance, support system 10 may receive a signal to unroll rolled material 12 from roller 16. When rolled material 12 is extended from roller 16, longitudinal axis L of roller 16 is translated in a vertically downward direction. In another example, support system 10 may receive a signal to wrap rolled material 12 around roller 16. When rolled material 12 is wrapped about roller 16, longitudinal axis L of roller 16 translates in a vertically upward direction.

Referring to FIG. 4, in one embodiment, support system 10 includes a controller 120 and an operator interface 122. In one embodiment, operator interface 122 is a wall switch. In one embodiment, operator interface 122 is a remote control which sends a wireless signal (IR or RF) to a transceiver associated with controller 120. In one embodiment, operator interface 122 is software running on a personal data device, such as cell phone or other computing device. In one example the signal from operator interface 122 is provided to controller 120 over a network. Exemplary networks include both wired and wireless networks.

Controller 120 includes hardware and/or software to control the operation of support system 10 in response to a received signal from operator interface 122. Controller 120 actuates tubular motor 40 to rotate roller 16 and either raise or lower rolled material 12.

In various embodiments, stationary member 24, cover member 26 and/or base 34 may be aluminum extrusions. Additionally, in various embodiments, contact member 36 may be formed of plastic. Exemplary plastics include thermoplastics and thermosets. In one embodiment, contact member 36 is formed of ultra high molecular weight (UHMW) polyethylene. UHMW polyethylene resists wear and has lower coefficient of friction than aluminum thus permitting easier movement of rolled material 12 across contact surface 78 (see FIG. 8A).

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

Furthermore, the connecting lines shown in the various figures contained herein are intended to represent exemplary functional relationships and/or physical couplings between the various elements. It should be noted that many alternative or additional functional relationships or physical connections may be present in a practical system. Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A support system for a rolled material moveable between a rolled configuration and an extended configuration, the support system comprising:
    a roller having a longitudinal axis, the roller adapted to be coupled to the rolled material;
    a housing supporting the roller and having a dispensing passage through which the rolled material extends; and
    a cradle extending along a first longitudinal length of the roller, the cradle including a base coupled to the housing and a contact member supported by the base, the base including at least one pedestal and an arcuate member supported by the at least one pedestal, wherein the contact member and the base are positioned directly below the longitudinal axis of the roller in a vertical direction, the contact member is positionable to contact the rolled material, and the contact member remains stationary as the rolled material moves between the rolled configuration and the extended configuration.

2. The support system of claim 1, wherein the base is supported by a portion of the housing extending under the roller in a vertical direction.

3. The support system of claim 1, wherein the base is removeably coupled to the housing.

4. The support system of claim 1, wherein the dispensing passage is located on a bottom side of the housing.

5. The support system of claim 1, wherein the contact member is removably coupled to the base.

6. The support system of claim 1, wherein an overall longitudinal length of the cradle is less than the first longitudinal length of the roller, the first longitudinal length of the roller being a portion of the roller adapted to receive the rolled material.

7. The support system of claim 1, wherein an overall longitudinal length of the cradle is longer than the first longitudinal length of the roller, the first longitudinal length of the roller being a portion of the roller adapted to receive the rolled material.

8. The support system of claim 1, wherein an overall longitudinal length of the cradle is substantially equal to the first longitudinal length of the roller, the first longitudinal length of the roller being a portion of the roller adapted to receive the rolled material.

9. A method for moving a rolled material between a rolled configuration and an extended configuration, comprising:
providing a support system according to claim 1 with the rolled material coupled to the roller of the support system;
receiving a signal to one of move the rolled material towards the rolled configuration and move the rolled material towards the extended configuration; and
actuating the roller with a tubular motor positioned in the roller, in response to the signal.

10. The support system of claim 1, wherein the contact member includes a bottom surface which contacts a top surface of the base.

11. The support system of claim 1, wherein the roller is rotatable relative to the housing and moveable in the vertical direction relative to the housing.

12. The support system of claim 11, wherein the housing includes at least one housing member extending along the longitudinal axis of the roller, a first end cap removably coupled to a first end of the at least one housing member, and a second end cap removably coupled to a second end of the at least one housing member.

13. The support system of claim 12, wherein the roller is coupled to the first end cap through a first mount and to the second end cap through a second mount, each of the first mount and the second mount being translatable relative to the respective first end cap and second end cap in the vertical direction.

14. The support system of claim 13, wherein the first and second mounts each include a first longitudinal member, a second longitudinal member, and a coupling member, each of the first and second longitudinal members having a longitudinal channel, and the coupling member being received within the respective longitudinal channels of the first and second longitudinal members.

15. The support system of claim 1, wherein the housing includes at least one stop member which limits a displacement of the roller in the vertical direction.

16. The support system of claim 15, wherein the roller is at a first vertical location when the rolled material is in the rolled configuration and supported by the cradle and the roller is at a second vertical location when the rolled material is in the rolled configuration, unsupported by the cradle, and supported by the at least one stop member of the housing, the first vertical location being vertically above the second vertical location.

17. The support system of claim 1, wherein the contact member has a contact surface made of a first material and the base is made of a second material.

18. The support system of claim 17, wherein both the contact member and the base are extruded.

19. The support system of claim 17, wherein the first material is a plastic.

20. The support system of claim 17, wherein the first material is a thermoplastic material.

21. The support system of claim 20, wherein the contact member is removably coupled to the base.

22. The support system of claim 21, wherein a portion of one of the base and the contact member is received by a portion of the other of the base and the contact member.

23. The support system of claim 21, wherein the contact member receives the base member and is slidable relative to the base member along the longitudinal axis.

24. A projection screen assembly comprising the support system of claim 1 and a rolled material coupled to the roller, the rolled material being a projection screen having a substantially blank display surface.

25. The projection screen assembly of claim 24, wherein the substantially blank display surface has a reflectivity gain from about 0.4 to about 2.5.

26. A shade assembly comprising the support system of claim 1 and a rolled material coupled to the roller, the rolled material being a shade material.

27. The shade assembly of claim 26, wherein the shade material includes a fabric.

28. The shade assembly of claim 26, wherein the shade material includes a screen.

29. The shade assembly of claim 26, wherein the shade material includes a plurality of protrusions along a first vertical edge of the shade material and a second vertical edge of the shade material.

30. The shade assembly of claim 29, further comprising a plurality of side channels positioned below the housing of the support system, each of the plurality of side channels including an interior region configured to capture a portion of the plurality of protrusions of the shade material.

31. A support system for a rolled material moveable between a rolled configuration and an extended configuration, the support system comprising:
a roller having a longitudinal axis, the roller adapted to be coupled to rolled material;
a housing supporting the roller and having a dispensing passage through which the rolled material extends, the dispensing passage being positioned horizontally between a rear wall of the housing and the roller; and
a cradle removeably coupled to the housing below the roller in a vertical direction, the cradle extending along a first longitudinal length of the roller, a position of a longitudinal axis of an arcuate portion of the cradle being horizontally maintained relative to the longitudinal axis of the roller both in the rolled configuration of the rolled material and in the extended configuration of the rolled material, the cradle being positioned directly below the longitudinal axis of the roller to support the roller in the vertical direction, wherein the cradle remains stationary as the rolled material moves between the rolled configuration and the extended configuration, and an overall longitudinal length of the cradle is less than an overall longitudinal length of the housing.

32. The support system of claim 31, wherein the housing defines an interior, the cradle being positioned completely within the interior of the housing and spaced apart from a first longitudinal end of the housing and a second longitudinal end of the housing.

33. The support system of claim 31, wherein the overall longitudinal length of the cradle is less than a first longitudinal length of the roller, the first longitudinal length of the roller being a portion of the roller adapted to receive the rolled material.

34. The support system of claim 31, wherein the overall longitudinal length of the cradle is longer than a first longitudinal length of the roller, the first longitudinal length of the roller being a portion of the roller adapted to receive the rolled material.

35. The support system of claim 31, wherein the overall longitudinal length of the cradle is substantially equal to a first longitudinal length of the roller, the first longitudinal length of the roller being a portion of the roller adapted to receive the rolled material.

36. The support system of claim 31, wherein a center of the cradle is positioned vertically below the longitudinal axis of the roller.

37. A method for moving a rolled material between a rolled configuration and an extended configuration, comprising:
providing a support system according to claim 31 with the rolled material coupled to the roller of the support system;
receiving a signal to one of move the rolled material towards the rolled configuration and move the rolled material towards the extended configuration; and
actuating the roller with a tubular motor positioned in the roller, in response to the signal.

38. The support system of claim 31, wherein the housing includes at least one housing member extending along the longitudinal axis of the roller, a first end cap coupled to a first end of the at least one housing member, and a second end cap coupled to a second end of the at least one housing member, the roller being coupled to the first end cap through a first mount and to the second end cap through a second mount.

39. The support system of claim 38, wherein the first mount and the second mount restrict the roller to a vertical transverse movement relative to the longitudinal axis of the roller.

40. A support system for a rolled material moveable between a rolled configuration and an extended configuration, the support system comprising:
a roller having a longitudinal axis, the roller adapted to be coupled to the rolled material;
a housing supporting the roller and having a dispensing passage through which the rolled material extends, the roller being restricted to translational movement in a vertical direction while the rolled material moves between the rolled configuration and the extended configuration;
a first stop member supported by the housing and positioned adjacent a first end of the roller;
a second stop member supported by the housing and positioned adjacent a second end of the roller; and
a cradle extending along a first longitudinal length of the roller, wherein the cradle is positioned directly below the longitudinal axis of the roller to support the roller in the vertical direction and the first and second stop members are configured to support the roller when the roller is unsupported by the cradle.

41. The support system of claim 40, wherein the cradle includes a base coupled to the housing and a contact member supported by the base.

42. The support system of claim 40, wherein the roller is at a first vertical location when the rolled material is in the rolled configuration and supported by the cradle and the roller is at a second vertical location when the rolled material is in the rolled configuration, unsupported by the cradle, and supported by the at least one of the first stop member and the second stop member of the housing, the first vertical location being vertically above the second vertical location.

43. A method for moving a rolled material between a rolled configuration and an extended configuration, comprising:
providing a support system according to claim 40 with the rolled material coupled to the roller of the support system;
receiving a signal to one of move the rolled material towards the rolled configuration and move the rolled material towards the extended configuration; and
actuating the roller with a tubular motor positioned in the roller, in response to the signal.

44. The support system of claim 40, wherein the first stop member is coupled to a first end cap of the housing and the second stop member is coupled to a second end cap, the first and second end caps being removably coupled to the housing.

45. The support system of claim 44, wherein a first end of the roller is coupled to the housing through a first mount and a second end of the roller is coupled to the housing through a second mount, a portion of the first mount and a portion of the second mount abutting the first and second stop members respectively when the roller is unsupported by the cradle.

46. A support system for a rolled material moveable between a rolled configuration and an extended configuration, the support system comprising:
a roller having a longitudinal axis, the roller adapted to be coupled to the rolled material;
a housing supporting the roller and having a dispensing passage through which the rolled material extends, the housing including at least one stop member with limits the displacement of the roller in the vertical direction; and
a cradle extending along a first longitudinal length of the roller, the cradle including a base coupled to the housing and a contact member supported by the base, the contact member and the base being positioned directly below the longitudinal axis of the roller in a vertical direction, the contact member being positionable to contact the rolled material, and the contact member remaining stationary as the rolled material moves between the rolled configuration and the extended configuration, wherein the roller is at a first vertical location when the rolled material is in the rolled configuration and supported by the cradle and the roller is at a second vertical location when the rolled material is in the rolled configuration, unsupported by the cradle, and supported by the at least one stop member of the housing, the first vertical location being vertically above the second vertical location.

47. A support system for a rolled material moveable between a rolled configuration and an extended configuration, the support system comprising:
a roller having a longitudinal axis, the roller adapted to be coupled to the rolled material;
a housing supporting the roller and having a dispensing passage through which the rolled material extends; and
a cradle extending along a first longitudinal length of the roller, the cradle including a base coupled to the housing and a contact member supported by the base, the contact member having a contact surface made of a thermoplastic material and the base being made of a second material, the contact member and the base being positioned directly below the longitudinal axis of the roller in a vertical direction, the contact member being positionable to contact the rolled material, and the contact member remaining stationary as the rolled material moves between the rolled configuration and the extended configuration, wherein the contact member is removably coupled to the base such that the contact member receives the base member and is slidable relative to the base member along the longitudinal axis.

* * * * *